United States Patent
Wang et al.

(10) Patent No.: US 9,674,674 B2
(45) Date of Patent: Jun. 6, 2017

(54) UNICAST AND BROADCAST RECEPTION POLICY AND ENFORCEMENT

(71) Applicant: QUALCOMM Incorporated, San Diego, CA (US)

(72) Inventors: Jun Wang, Poway, CA (US); Gordon Kent Walker, Poway, CA (US); Charles Nung Lo, San Diego, CA (US); Thomas Stockhammer, Bergen (DE); Nagaraju Naik, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 14/508,074

(22) Filed: Oct. 7, 2014

(65) Prior Publication Data

US 2015/0109987 A1    Apr. 23, 2015

Related U.S. Application Data

(60) Provisional application No. 61/894,502, filed on Oct. 23, 2013.

(51) Int. Cl.
*H04H 20/71* (2008.01)
*H04W 4/06* (2009.01)
*H04L 12/14* (2006.01)
*H04W 12/08* (2009.01)

(52) U.S. Cl.
CPC ........... *H04W 4/06* (2013.01); *H04L 12/1407* (2013.01); *H04L 12/1485* (2013.01); *H04W 12/08* (2013.01)

(58) Field of Classification Search
CPC ....... H04W 4/06; H04W 12/00; H04W 12/08; H04L 12/1407; H04L 12/1485
See application file for complete search history.

(56) References Cited

U.S. PATENT DOCUMENTS

| | | | |
|---|---|---|---|
| 2010/0165902 A1* | 7/2010 | Kvernvik | H04L 12/189 370/312 |
| 2010/0325666 A1* | 12/2010 | Wiser | H04N 7/17336 725/44 |
| 2011/0149827 A1* | 6/2011 | Na | H04L 12/189 370/312 |
| 2013/0232555 A1* | 9/2013 | Zhang | H04W 12/08 726/4 |

(Continued)

*Primary Examiner* — Ayaz Sheikh
*Assistant Examiner* — Hai-Chang Hsiung
(74) *Attorney, Agent, or Firm* — The Marbury Law Group, PLLC

(57) ABSTRACT

Systems, methods, and devices of the various embodiments enable the use of a broadcast bearer (such as a Multimedia Broadcast Multicast Service ("MBMS") bearer), unicast bearer, or both a unicast bearer and a broadcast bearer to deliver content to a receiver device. In various embodiments, network policy governing delivery of one or more service or one or more classes of services via a unicast bearer and a broadcast bearer may be provided to one or more devices in the network. In various embodiments, network policy may be applied to the unicast or broadcast delivery selections of a service to control use of a unicast bearer and/or the broadcast bearer to provision the service.

15 Claims, 21 Drawing Sheets

(56) References Cited

U.S. PATENT DOCUMENTS

2013/0288668 A1* 10/2013 Pragada ................ H04W 12/06
  455/426.1
2014/0006951 A1* 1/2014 Hunter .................. H04H 60/31
  715/719
2014/0198645 A1* 7/2014 Worrall .................. H04W 4/06
  370/230

* cited by examiner

UNICAST AND BROADCAST RECEPTION POLICY AND ENFORCEMENT

CROSS REFERENCE TO RELATED APPLICATIONS

This application claims the benefit of priority to U.S. Provisional Patent Application No. 61/894,502 entitled "Unicast and Broadcast Reception Policy and Enforcement" filed Oct. 23, 2013, the entire contents of which are hereby incorporated by reference.

BACKGROUND

In current evolved Multimedia Broadcast Multicast Service ("eMBMS") networks established according to the 3rd Generation Partnership Projects ("3GPP") Technical Standard ("TS") 26.346 Release 11, networks, services, such as audio or video streaming, can be provided via broadcast bearers, such as Multimedia Broadcast Multicast Service ("MBMS") bearers, or unicast bearers. Current eMBMS networks can indicate that unicast access to a service is available via a "unicastAccessURI" and indicate the repair server Uniform Resource Locator ("URL") in a User Service Description ("USD").

SUMMARY

The systems, methods, and devices of the various embodiments enable the use of a broadcast bearer (such as a Multimedia Broadcast Multicast Service ("MBMS") bearer), unicast bearer, or both a unicast bearer and a broadcast bearer to deliver content to a receiver device. In various embodiments, network policy governing delivery of one or more service or one or more classes of services via a unicast bearer and a broadcast bearer may be provided to one or more devices in the network. In various embodiments, network policy may be applied to the unicast or broadcast delivery selections of a service to control use of a unicast bearer and/or the broadcast bearer to provision the service.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
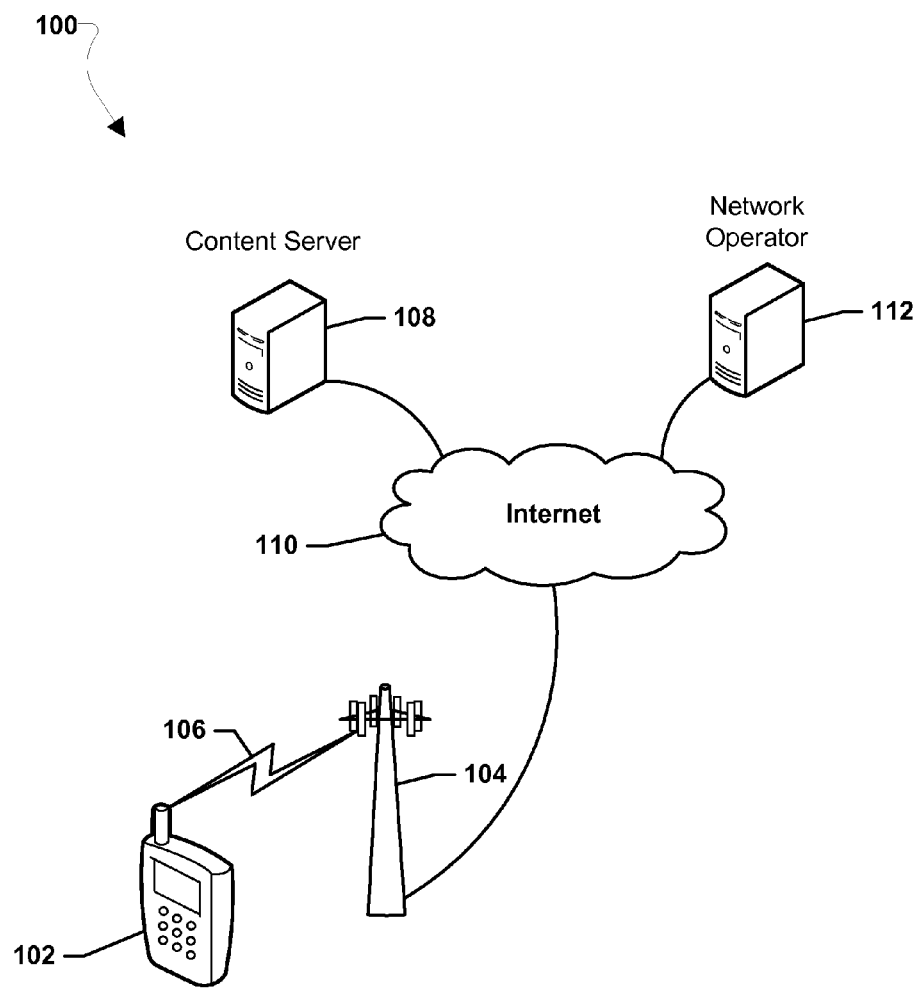
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "receiver device" is used herein to refer to any one or all of cellular telephones, smart phones, personal or mobile multi-media players, personal data assistants ("PDAs"), personal computers, laptop computers, tablet computers, smart books, palm-top computers, wireless electronic mail receivers, multimedia Internet enabled cellular telephones, wireless gaming controllers, personal computers, television set top boxes, televisions, cable television receivers, and similar personal electronic devices which include a programmable processor and memory and circuitry for receiving files and providing files to requesting applications/clients via unicast and/or MBMS bearers.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As used herein a "dual unicast/MBMS service" is a service that is provided via both a unicast bearer and a MBMS bearer in a network.

The systems, methods, and devices of the various embodiments enable the use of a broadcast bearer (e.g., a Multimedia Broadcast Multicast Service ("MBMS") bearer), unicast bearer, or both a unicast bearer and a broadcast bearer to deliver content to a receiver device. In various embodiments, network policy governing delivery of one or more service or one or more classes of services via a unicast bearer and a broadcast bearer may be provided to one or more devices in the network. In various embodiments, network policy may be applied to the unicast or broadcast delivery selections of a service to control use of a unicast bearer and/or the broadcast bearer to provision the service.

In an embodiment, network policy may govern use of unicast reception and broadcast reception by a receiver device. For example, network policy may force a receiver device to use an MBMS bearer to receive a dual unicast/MBMS service when MBMS is available, but may allow the receiver device to fall back to the unicast bearer to receive the service when MBMS is unavailable. MBMS availability may be determined in any manner. For example, the receiver device may determine that MBMS is not available for a service when no temporary mobile group identifier ("TMGI") or service area identifier ("SAT") for the service is available in a system information block ("SIB") and/or multicast control channel ("MCCH"). As another example, the receiver device may determine that MBMS is not available for a service when the MBSFN Reference Signal Received Power ("RSRP"), MBSFN Reference Signal Received Quality ("RSRQ"), and/or MBSFN signal to noise ratio ("SNR") is lower than a defined threshold. As a further example, the receiver device may determine that MBMS is not available when the receiver device detects a number of segments or packets (e.g., FLUTE or RTP packets) are lost for a defined duration. In a similar manner, the receiver device may determine that MBMS is available or restored when the TMGI or SAT is available in the SIB and/or MCCH, the RSRP, RSRQ, and/or SNR becomes greater than the defined threshold, and/or the receiver device detects a number of segments or packets are successfully received during a defined duration. In a further embodiment, network policy may also govern use of unicast reception based on the radio technology type that the unicast reception will used. For example, network policy may allow and/or prevent unicast reception based on whether the unicast reception will be performed using a 3G, 4G, Wi-Fi, licensed band, and/or unlicensed band technology.

In an embodiment, network policy may govern receiver device handover between unicast reception and broadcast reception when a receiver device is mobile. For example, network policy may govern whether or not the receiver device may use an MBMS bearer to receive a service or class of services when the receiver device moves in and out of MBMS coverage. As a specific example, network policy may force a receiver device to use an MBMS bearer to receive a dual unicast/MBMS service when MBMS is available, but may allow the receiver device to use a unicast bearer to receive the dual unicast/MBMS service when switching from one Multicast-Broadcast Single Frequency Network ("MBSFN") area to another MBSFN area. As an example, to make handoff across MBSFN areas seamless, when moving from one MBSFN area to a second MBSFN area the receiver device may switch from MBMS reception to unicast reception when leaving the first MBSFN area and then back to MBMS reception in the second MBSFN area. As used herein, the term "area" refers to a region of service defined by or within a communication network, such as an SAI.

In an embodiment, network policy may govern repair and/or replacement of segments of a service. As an example, network policy may force a receiver device to use an MBMS bearer to receive a dual unicast/MBMS service when MBMS is available, but may allow individual on-the fly segment repair with forward error correction ("FEC") via a unicast bearer. As another example, network policy may force a receiver device to use an MBMS bearer to receive a dual unicast/MBMS service when MBMS is available, but allow on-the-fly segment replacement via a unicast bearer. As a specific example, the receiver device may be allowed to download from a unicast bearer a segment lost during MBMS reception with the downloaded segment being a lower quality version of the broadcast segment, such as a lower bandwidth representation of a Dynamic Adaptive Streaming Over HTTP ("DASH") segment.

In an embodiment, network policy may govern receiver device use of unicast reception and broadcast reception to improve the receiver device switching experience. For example, network policy may force a receiver device to use an MBMS bearer to receive a dual unicast/MBMS service when MBMS is available, but may allow a unicast bearer to be used to receive segments of the service during a start up period when initially starting MBMS reception. The use of unicast reception temporarily during an initial start up period may enable the receiver device to receive larger segments via the MBMS bearer, which may lower the bandwidth requirements and improve the quality of experience for the MBMS feed when the receiver device begins receiving a service.

In an embodiment, network policy may govern receiver device use of unicast reception and broadcast reception to control how the receiver device receives secondary information for a service. Secondary information may be an auxiliary component of the service, such as subtitles for a video streaming service. As an example, the network policy may force a receiver device to use an MBMS bearer to receive primary information for a dual unicast/MBMS service when MBMS is available, but may allow a unicast bearer to be used to receive the secondary information for the service.

In an embodiment, network policy may govern receiver device use of unicast reception and broadcast reception to control network congestion with unicast traffic. For example, network policy may designate one or more areas as an MBMS only area. An MBMS only area may be an area in which receiver devices may only be allowed to use the MBMS bearer to receive a dual unicast/MBMS service. As noted above, an "area" is a zone or region defined in a communication network, and thus an MBMS area may be one or more venues, service areas, and/or MBSFN. When the receiver device determines that the current area in which the receiver device is located is a MBMS-only area, network policy may force the receiver device to only use broadcast reception for the service and file repair. In an embodiment, when the receiver device determines that it is outside MBMS coverage, network policy may allow file repair through unicast reception.

In an embodiment, network policy may govern use of unicast reception and broadcast reception by a receiver device based on a user preference. For example, a user may indicate a user preference for unicast reception by paying to be a member of an elevated user class or indicating a willingness to pay for unicast reception when selecting the service. Based on this user preference, a network policy may allow the receiver device to use the unicast bearer to receive the service while receiver devices not indicating such a user preference may be forced to use only broadcast reception for the service.

In an embodiment, network policy may govern use of unicast reception and broadcast reception by a receiver device based on a frequency band in which the service is deployed. For example, network policy may force a receiver device to use an MBMS bearer to receive a dual unicast/MBMS service when MBMS is available, but may allow a unicast bearer to be used to receive segments of the service when the MBMS bearer is deployed in an unlicensed band. As a specific example, when the MBMS bearer is available via a Wi-Fi® unlicensed band, network policy may allow the receiver device to use the unicast bearer to receive the service because the MBMS bearer may suffer from Wi-Fi® interference. As another example, when the frequency band is spectrum that is shared among different operators or service providers and an MBMS bearer is available on the shared spectrum, network policy may force a receiver device to use an MBMS bearer to receive a dual unicast/MBMS service.

In an embodiment, network policy may govern use of unicast reception and broadcast reception by a receiver device based on segment size of a service. For example, network policy may force a receiver device to use an MBMS bearer to receive a dual unicast/MBMS service when the average segment size of a service is above a threshold byte size.

In various embodiments, a receiver device may implement network policy at various levels on the receiver device. As examples, network policy may be implemented at the receiver device by an application, by a client (e.g., a DASH client or Real Time Streaming Protocol ("RTSP") client), by proxy (e.g., a DASH or RTSP proxy), by connection middleware (e.g., eMBMS middleware), by a modem layer, and/or by combinations of one or more of an application, client, proxy, connection middleware, and modem layer. For example, an application may implement network policy so that the application only launches within MBMS coverage. As another example, a DASH or RTSP client may implement network policy to request segments from a remote server and/or local cache. As a further example, a DASH or RTSP proxy may implement network policy to redirect requests for segments to a remote server or local cache. As yet another example, eMBMS middleware may implement network policy to control the activation of TMGIs. As another example, a modem layer may implement network policy to control setup to receive a service via a unicast bearer or tune to a MCCH and/or Multicast Traffic Channel ("MTCH") for a corresponding TMGI to receive a broadcast bearer.

In various embodiments, network policy may be implemented by network entities other than and/or in addition to receiver devices, including radio access network ("RAN") equipment (e.g., an eNode-B ("eNB"), etc.), and core network entities (e.g., an application and/or content server, a broadcast multicast service center ("BM-SC") server, packet gateway ("P-GW") server, traffic detection function ("TDF") server, network proxy server, DASH-Assisting Network Element ("DANE"), etc.), and/or by combinations of one or more of a receiver device, RAN equipment, and/or core network entities. For example, network policy may be implemented by an eNB to identify receiver devices in a connected and/or idle unicast state and tear down the unicast channel when network policy indicates only MBMS reception of a service is authorized. As another example, an application and/or content server (e.g., a DASH, HTTP, or RTSP server) may not send segments to unicast and/or MBMS entities that are not authorized by network policy. As a further example, a P-GW server may apply network policy to block unicast packets and/or mark a charging record for additional charges for unicast packets. As another example, a TDF server, network proxy server, or DANE may block unicast packets according to network policy.

In an embodiment, network policy related to unicast and/or broadcast reception of services may be generated at a policy and rules charging function ("PCRF") server. Network policy may be dynamically created and updated/changed due to network load changes, new services being added, and/or in response to other network changes. In the various embodiments, network policy may interact and/or depend on user policy, user classes, and/or user willingness to pay for unicast and/or broadcast services. Network policy may be created for each service or class of service based on various factors, such as unicast and broadcast coverage considerations, segment based repair and replacement requirements, quality of service considerations, start up latency and/or channel switching latency requirements, classes of users, network loading levels, etc.

Network policy and network policy updates may be provisioned to network entities or receiver devices in various manners. As an example, network policy may be preconfigured on a receiver device. As another example, network policy may be delivered through the access network discovery and selection function ("ANDSF"). As a further example, network policy may be delivered through the user service description ("USD"). As a further example, network policy may be delivered through the HTTP extension header or RTP/RTSP extension header. As a still further example, network policy may be delivered through the Parameters Enhancing Delivery ("PED") messages that are exchanged between DANEs or Parameters Enhancing Reception ("PER") messages that are sent from DANEs to DASH clients. As a further example, network policy may be delivered through the MBMS download service. As further examples, network policy may be delivered via short message service ("SMS"), via push methods (e.g., Open Mobile Alliance ("OMA") push or Wireless Application Protocol ("WAP") push, Web push), via a web browser, and/or via other delivery mechanisms.

In an embodiment, a receiver device may set a priority for reception via MBMS or unicast based on priority of a current application at the receiver device and/or network policy. The priority may be static or dynamic. When the priority is dynamic, the priority may be updated based on user preferences, additional activated/deactivated applications, network loading, manufacturer settings, and/or other considerations. The modem layer of the receiver device may control the connections to unicast and/or MBMS based on the priority and may send an MBMS interest indication message to the network indicating the selected priority.

Various examples of different applications/clients, middleware, segment availability timelines, radio technologies, and transport protocols are discussed herein, specifically DASH clients/proxies, RTSP clients/proxies, Multicast Service Device Clients, MPDs, USDs, ANDSFs, MBMS, eNBs, and HTTP. The discussions of DASH clients/proxies, RTSP clients/proxies, Multicast Service Device Clients, MPDs, USDs, ANDSFs, MBMS, eNBs, and HTTP are provided merely as examples to better illustrated the aspects of the various embodiments, and are not intended to limit the various embodiments in any way. Other applications/clients, middleware, segment availability timelines, radio technologies, and transport protocols may be used with the various embodiments, and the other applications/clients, middleware, segment availability timelines, radio technologies, and transport protocols may be substituted in the various examples without departing from the spirit or scope of the invention.

The various embodiments may improve the functioning of networks and/or receiver devices by enabling the use of a broadcast bearer (e.g., a MBMS bearer), unicast bearer, or both a unicast bearer and a broadcast bearer to deliver content to a receiver device. Additionally, the various embodiments may improve the functioning of networks and/or receiver devices by enabling network policy governing delivery of one or more service or one or more classes of services via a unicast bearer and a broadcast bearer to be provided to one or more devices in the network. Further, the various embodiments may improve the functioning of networks and/or receiver devices by enabling network policy to be applied to the unicast or broadcast delivery selections of a service to control use of a unicast bearer and/or the broadcast bearer to provision the service. The various embodiments may improve the functioning of networks and/or receiver devices by overcoming conventional limitations in current eMBMS networks, overcoming current limitations in specifying network policy, and/or overcoming current limitations in indicating other attributes that may specify selections of unicast and/or broadcast bearers for service delivery and/or reception.

FIG. 1 illustrates a network system 100 suitable for use with the various embodiments. The network system 100 may include multiple devices, such as a receiver device 102, one or more cellular towers or base stations 104, and one or more servers 108 and 112 connected to the Internet 110. The receiver device 102 may exchange data via one or more connections 106, including cellular connections, such as CDMA, TDMA, GSM, PCS, 3G, 4G, LTE, etc. connection, unlicensed band connections, such as Wi-Fi®, Bluetooth®, etc., connections, or any other type connection, with the cellular tower or base station 104. The cellular tower or base station 104 may be in communication with a router which may connect to the Internet 110. In this manner, via the connections to the cellular tower or base station 104, and/or Internet 110, data may be exchanged between the receiver device 102 and the server(s) 108 and 112. In an embodiment, server 108 may be a content server or encoder, such as an encoder providing MPDs and/or segments for output via a DASH client. In an embodiment, server 112 may be a network operator server controlling the operations of the server 108, the cellular network including the receiver device 102 and the cellular tower or base station 104 and controlling the over the air ("OTA") transmission of content to the receiver device 102. For example, the server 112 may control the server 108 and the cellular network including the receiver device 102 and the cellular tower or base station 104 to provide one or more service to the receiver device 102 via unicast and/or broadcast OTA transmissions. While features of receiver devices described herein may be described with reference to OTA transmissions, these features may be used in connection with wired transmissions, wireless transmissions, or a combination of wired and wireless transmissions. Thus, OTA transmission is not required.

Figure 2:
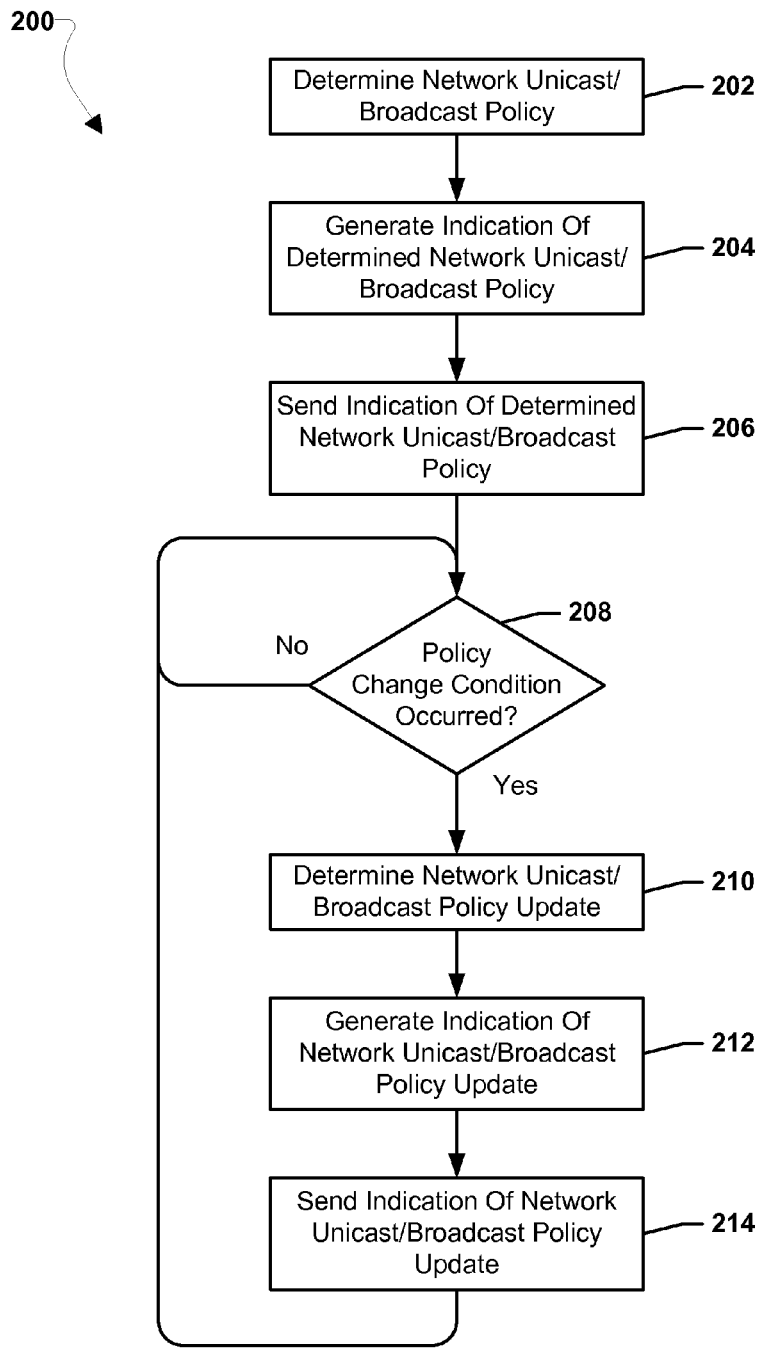
FIG. 2 is a process flow diagram illustrating an embodiment method for sending indications of network unicast/broadcast policy.

FIG. 2 illustrates an embodiment method 200 for sending indications of network unicast/broadcast policy. In an embodiment, the operations of method 200 may be performed by a network server, such as a PCRF server. In block 202 the server may determine the network unicast/broadcast policy. Network unicast/broadcast policy may govern how enforcement points in the network may handle requests for unicast and/or broadcast services and may be determined based on multiple factors, such as user policy, user classes, user willingness to pay for unicast and/or broadcast services, network loading, etc. Network unicast/broadcast policy may be determined for each service or class of service based on various factors, such as unicast and broadcast coverage considerations, segment based repair and replacement requirements, quality of service considerations, start up latency and/or channel switching latency requirements, classes of users, network loading levels, etc.

In block 204 the server may generate an indication of the determined unicast/broadcast policy. The indication of the determined unicast/broadcast policy may be an ANDSF, a USD, an element of an MBMS download service, an SMS message, a push indication, such as an OMA, WAP, or Web push indication, an HTML file accessible via a web browser, and/or some other type indication. In block 206 the server may send the indication of the determined unicast/broadcast policy to one or more device, such as a receiver device, eNB, BM-SC server, content server, P-GW server, TDF server, network proxy server, DANE, etc.

In determination block 208 the server may determine whether a policy change condition has occurred. A policy change condition may be any condition that may necessitate changing network policy. As examples, policy change conditions may include network load changes, new services being added, services being stopped, network configuration changes, etc. In response to determining that a policy change condition has not occurred (i.e., determination block 208="No"), the server may continue to wait for a change condition to occur.

In response to determining that a policy change condition has occurred (i.e., determination block 208="Yes"), the server may, in block 210, determine a network unicast/broadcast policy update based at least in part on the policy change condition that occurred. In block 212 the server may generate an indication of the determined unicast/broadcast policy update. The indication of the determined unicast/broadcast policy update may be a ANDSF, a USD, an element of an MBMS download service, an SMS message, a push indication, such as an OMA or WAP push indication, an HTML file accessible via a web browser, and/or some other type indication. In block 214 the server may send the indication of the determined unicast/broadcast policy update to one or more device, such as a receiver device, eNB, BM-SC server, content server, P-GW server, TDF server, network proxy server, DANE, etc., and await the next occurrence of a policy change condition in determination block 208. In this manner, the network policy may be dynamically modified.

Figure 3:
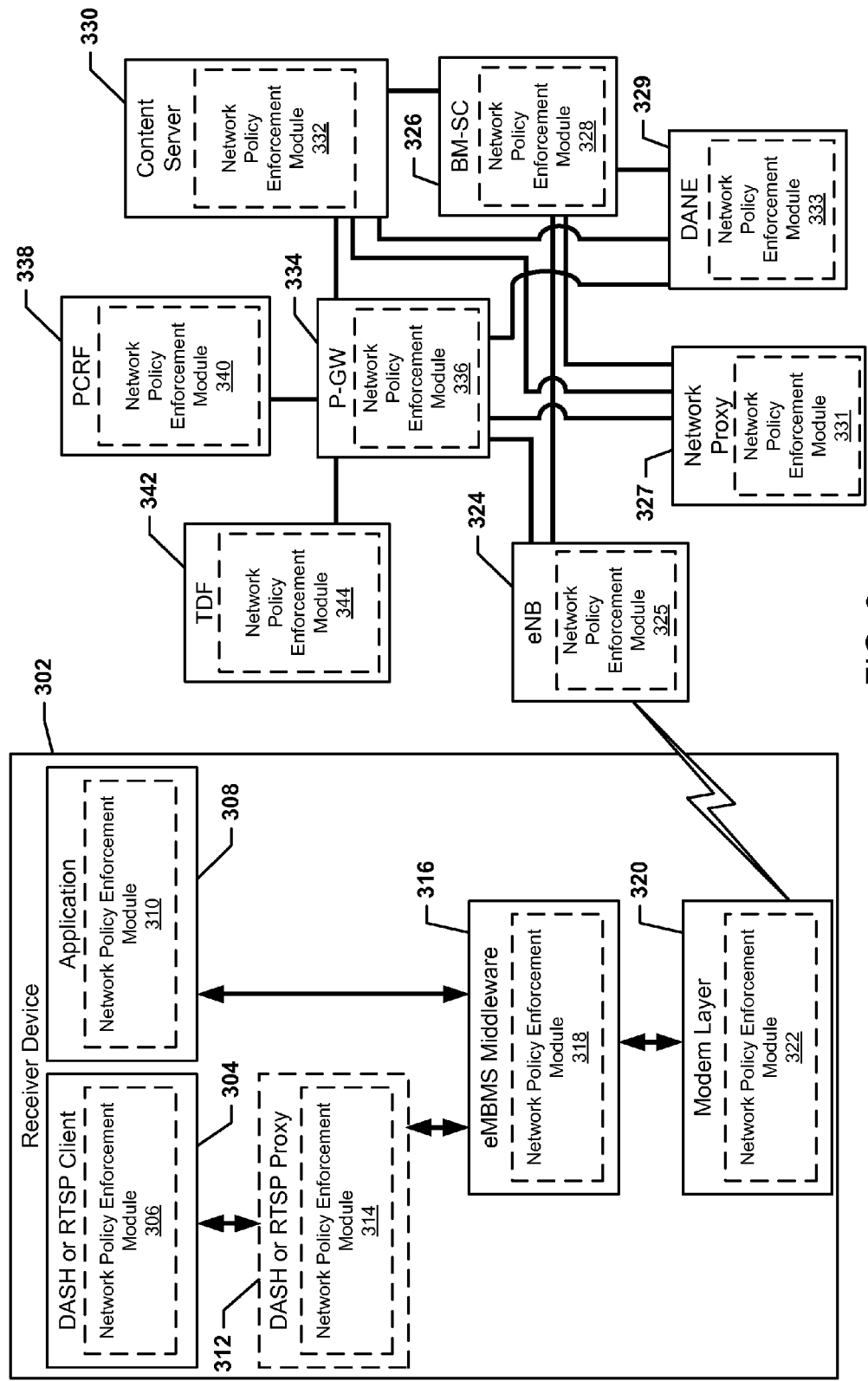
FIG. 3 is a block diagram of receiver device and network architecture according to an embodiment.

FIG. 3 is a block diagram of a receiver device 302 and network architecture according to an embodiment. As discussed below, a variety of the components of the architecture include network policy enforcement modules. These network policy enforcement modules may be optional for any component depending, for example, upon the particular implementation of the architecture. In further detail, the receiver device 302 may include a DASH or an RTSP client 304 that may include a network policy enforcement module 306. The network policy enforcement module 306 may enable the DASH or RTSP client 304 to apply network policy to govern how the DASH or RTSP client 304 requests/retrieves segments for a service. For example, the network policy enforcement module 306 may control the DASH or RTSP client to request segments for a service from a remote server or a local cache based on network policy. The DASH or RTSP client 304 may interface with an optional DASH or RTSP proxy 312 that may interface with the eMBMS middleware 316. Alternatively, the DASH or RTSP client 304 may interface directly with the eMBMS middleware 316. The DASH or RTSP proxy 312 may include a network policy enforcement module 314. The network policy enforcement module 314 may enable the DASH or RTSP proxy 312 to apply network policy to govern how the DASH or RTSP proxy 312 requests/retrieves segments for a service and/or provides segments of the service to requesting clients. For example, the network policy enforcement module 314 may redirect a client to a remote server or a local cache based on a network policy.

The receiver device 302 may include an application 308 that may include a network policy enforcement module 310. The network policy enforcement module 310 may enable the application 308 to apply network policy to govern how the application consumes a service. For example, the network policy enforcement module 310 may only allow the application to be launched when the receiver device 302 is in MBMS coverage. The application 308 may interface with the eMBMS middleware 316. The eMBMS middleware 316 may include a network policy enforcement module 318. The network policy enforcement module 318 may enable the eMBMS middleware 316 to apply network policy to govern how broadcast services are used. For example, the network policy enforcement module 318 may control whether TMGI(s) for a service are activated or not activated.

The eMBMS middleware 316 may interface with the modem layer 320 of the receiver device 302. The modem layer 320 may include a network policy enforcement module 322. The network policy enforcement module 322 may apply network policy to govern how the modem layer 320 tunes to a unicast bearer and/or broadcast bearer. For example, the network policy enforcement module 322 may control the modem set up to tune to a unicast bearer or to tune to an MCCH and/or MTCH for a corresponding TMGI.

The receiver device 302 may connect with an eNB 324 to receive services via unicast or broadcast bearers. The eNB 324 may connect with a BM-SC server 326 to receive broadcast content and a P-GW server 334 to receive unicast content. The eNB 324 may include a network policy enforcement module 325. The network policy enforcement module 325 may govern how the eNB 324 creates connections with receiver device 302 to deliver services. For example, network policy may prevent unicast delivery of a service, and the network policy enforcement module 325 may control the eNB 324 to identify any receiver devices in a connected or idle unicast state and tear down the unicast channels for those receiver devices.

The BM-SC server 326 may interface with a content server 330. The BM-SC server 326 may include a network policy enforcement module 328. The network policy enforcement module 328 may govern how the BM-SC server 326 sends content from the content server 330 to the eNB 324. For example, the network policy enforcement module 328 may control the BM-SC server 326 to not send content to an eNB 324 that is associated with a service area in which MBMS service is not to be made available. The BM-SC server 326 and/or the content server 330 may also interface with a network proxy server 327 and/or a DANE server 329. The network proxy server 327 may include a network policy enforcement module 331. The DANE server 329 may include a network policy enforcement module 333.

The P-GW server 334 may interface with the content server 330 to request content form the content server 330. The P-GW server 334 may include a network policy enforcement module 336 that may govern how the P-GW server 334 passes packets for a unicast service. For example, the network policy enforcement module 336 may cause the P-GW server 334 to block packets for a unicast service or mark it in a charging record. The content server 330 may include a network policy enforcement module 332 that may govern how the content server 330 responds to requests for content. For example, the network policy enforcement module 332 may prevent the content server 330 from sending content in response to unicast requests. The P-GW server 334 may also interface with the network proxy server 327 and/or the DANE server 329. The P-GW server 334 may interface with a TDF server 342. The TDF server 342 may include a network policy enforcement module 344 that may govern how the TDF server 342 handles packets. For example, using deep packet inspection the TDF server may determine a type of packets moving through the network and the network policy enforcement module 344 may control the TDF to block unicast packets. The P-GW server 334 may also interface with a PCRF server 338 that may include a network policy enforcement module 340. The network policy enforcement module 340 may enable the PCRF server 338 to create and/or update network policies based on various factors such as network loading, and send network policy and/or network policy updates to one or more of the network policy enforcement modules 306, 310, 314, 318, 322, 325, 328, 331, 332, 333, 336, 340, and/or 344.

Figure 4:
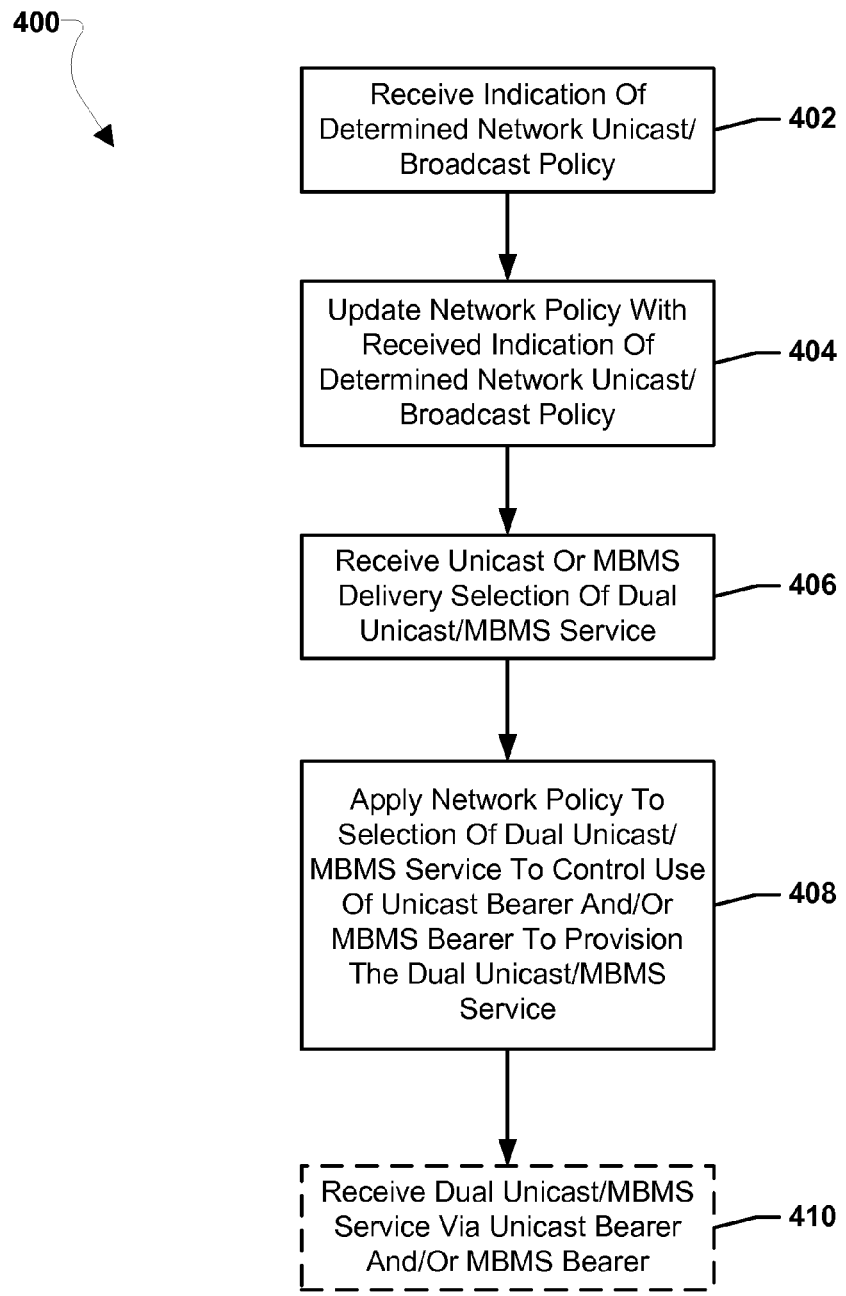
FIG. 4 is a process flow diagram illustrating an embodiment method for applying network policy to control the use of a unicast bearer and/or MBMS bearer to receive a dual unicast/MBMS service.

FIG. 4 illustrates an embodiment method 400 for applying network policy to control the use of a unicast bearer and/or MBMS bearer to receive a dual unicast/MBMS service. In an embodiment, the operations of method 400 may be performed by the processor of a device in a network, such as a receiver device, eNB, content server, BM-SC server, P-GW server, TDF server, network proxy server, DANE, etc. In an embodiment, the operations of method 400 may be performed in conjunction with the operations of method 200 described above with reference to FIG. 2.

In block 402 the device processor may receive an indication of the determined network unicast/broadcast policy. The network unicast/broadcast policy may be received via accessing the network unicast/broadcast policy that may be pre-provisioned in a memory available to the device processor, such as network unicast/broadcast policy installed in the memory at the time of manufacture of the device. Alternatively, the network unicast/broadcast policy may be received through the ANDSF, USD, MBMS download service, SMS, OMA push, WAP push, a web browser, and/or some other delivery mechanism providing the policy to the device. In block 404 the device processor may update the network policy stored within the device with the received network unicast/broadcast policy. As examples, updating network policy stored within the device may involve adding to and/or replacing network policy records stored in a memory available to the device.

In block 406 the device processor may receive a unicast or MBMS delivery selection of a dual unicast/MBMS service. For example, when the device is a receiver device, the unicast or MBMS delivery selection of the dual unicast/MBMS service may be an indication that a service was selected by a user, a client, and/or an application for receipt via either the MBMS bearer or the unicast bearer. As another example, when the device is an eNB, the unicast or MBMS delivery selection of the dual unicast/MBMS service may be an indication that a receiver device is attempting to establish a unicast connection. As a further example, when the device is a BM-SC server, P-GW server, TDF server, network proxy server, or DANE, the unicast or MBMS delivery selection of the dual unicast/MBMS service may be a request for content at the BM-SC server, P-GW server, TDF server, network proxy server, or DANE.

In block 408 the device processor may apply a network policy to the selection of the dual unicast/MBMS service to control the use of a unicast bearer and/or MBMS bearer to provision the dual unicast/MBMS service. For example, the device processor may apply a network policy to force a receiver device to use an MBMS bearer to receive a dual unicast/MBMS service when MBMS is available, but allow the receiver device to fall back to the unicast bearer to receive the service when MBMS is unavailable. Various additional methods for applying network policies to a unicast or MBMS delivery selection of a service to control use of the unicast bearer or the MBMS bearer to provision the service are discussed in below. In optional block 410, the device processor may receive the dual unicast/MBMS service via the unicast bearer and/or the MBMS bearer.

Figure 5:
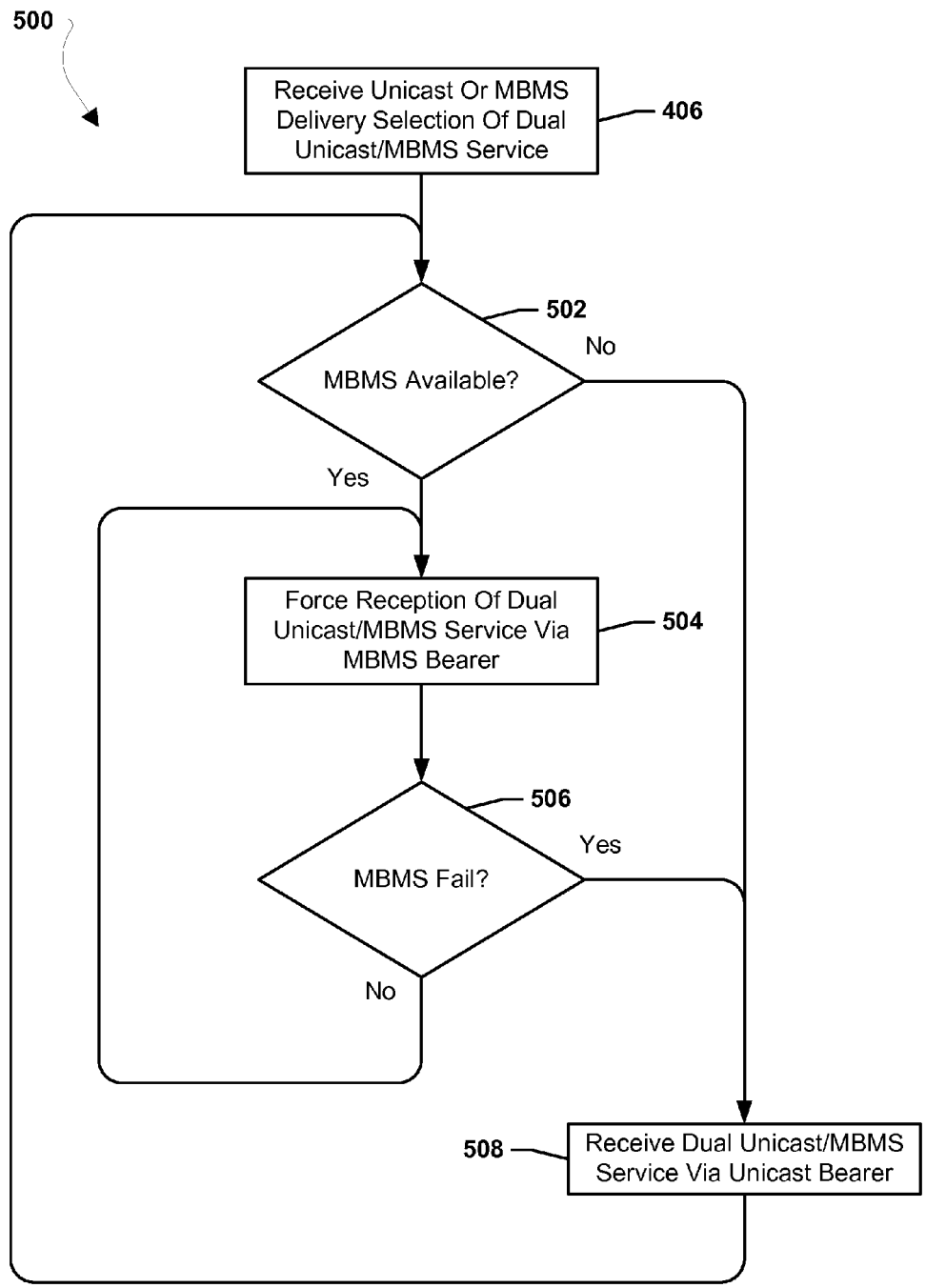
FIG. 5 is a process flow diagram illustrating an embodiment method for implementing network policy to control receiving a dual unicast/MBMS service via a unicast bearer or MBMS bearer based at least in part on MBMS availability.

FIG. 5 illustrates an embodiment method 500 for implementing a network policy to control receiving a dual unicast/MBMS service via a unicast bearer or MBMS bearer based at least in part on MBMS availability. In an embodiment, the operations of method 500 may be performed by the processor of a receiver device. In an embodiment, the operations of method 500 may be performed in conjunction with the operations of method 400 described above with reference to FIG. 4.

As discussed above, in block 406 the receiver device processor may receive a unicast or MBMS delivery selection of a dual unicast/MBMS service. In determination block 502 the receiver device processor may determine whether MBMS is available. For example, the receiver device processor may determine that MBMS is not available for a service when no temporary mobile group identifier ("TMGI") or service area identifier ("SAT") for the service is available in a system information block ("SIB") and/or multicast control channel ("MCCH"). As another example, the receiver device processor may determine that MBMS is not available for a service when the MBSFN Reference Signal Received Power ("RSRP"), MBSFN Reference Signal Received Quality ("RSRQ"), and/or MBSFN signal to noise ratio ("SNR") is lower than a defined threshold. As a further example, the receiver device processor may determine that MBMS is not available when the receiver device detects a number of segments or packets (e.g., FLUTE or RTP packets) are lost for a defined duration. In a similar manner, the receiver device processor may determine that MBMS is available or restored when the TMGI or SAT is available in the SIB and/or MCCH, the RSRP, RSRQ, and/or SNR becomes greater than the defined threshold, and/or the receiver device processor detects a number of segments or packets are successfully received during a defined duration.

In response to determining that MBMS is available (i.e., determination block 502="Yes"), the receiver device processor may force reception of the dual unicast/MBMS service via the MBMS bearer in block 504. In this manner, regardless of whether the selection was for unicast or MBMS delivery of the service, the network policy may force the reception of the service via MBMS when MBMS is available.

In determination block 506 the receiver device processor may determine whether MBMS has failed. As an example, the receiver device processor may determine that MBMS has failed after starting reception of a service when the signal to noise ratio ("SNR") drops below a defined threshold. As another example, the receiver device processor may determine that MBMS has failed when the receiver device detects that a number of segments or packets (e.g., FLUTE or RTP packets) are lost for over a defined duration. In response to determining that MBMS has not failed (i.e., determination block 506="No"), the receiver device processor may continue forcing reception of the dual unicast/MBMS service via the MBMS bearer in block 504.

In response to determining that MBMS is not available (i.e., determination block 502="No") or that MBMS has failed (i.e., determination block 506="Yes"), the receiver device processor may receive the dual unicast/MBMS service via the unicast bearer in block 508. In this manner, network policy may enable the unicast bearer to act as a fallback for the MBMS bearer. In determination block 502 the receiver device processor may again determine whether MBMS has become available and respond accordingly as described above. In this manner, network policy may cause the receiver device processor to switch back to MBMS reception of the service should MBMS become available.

Figure 6:
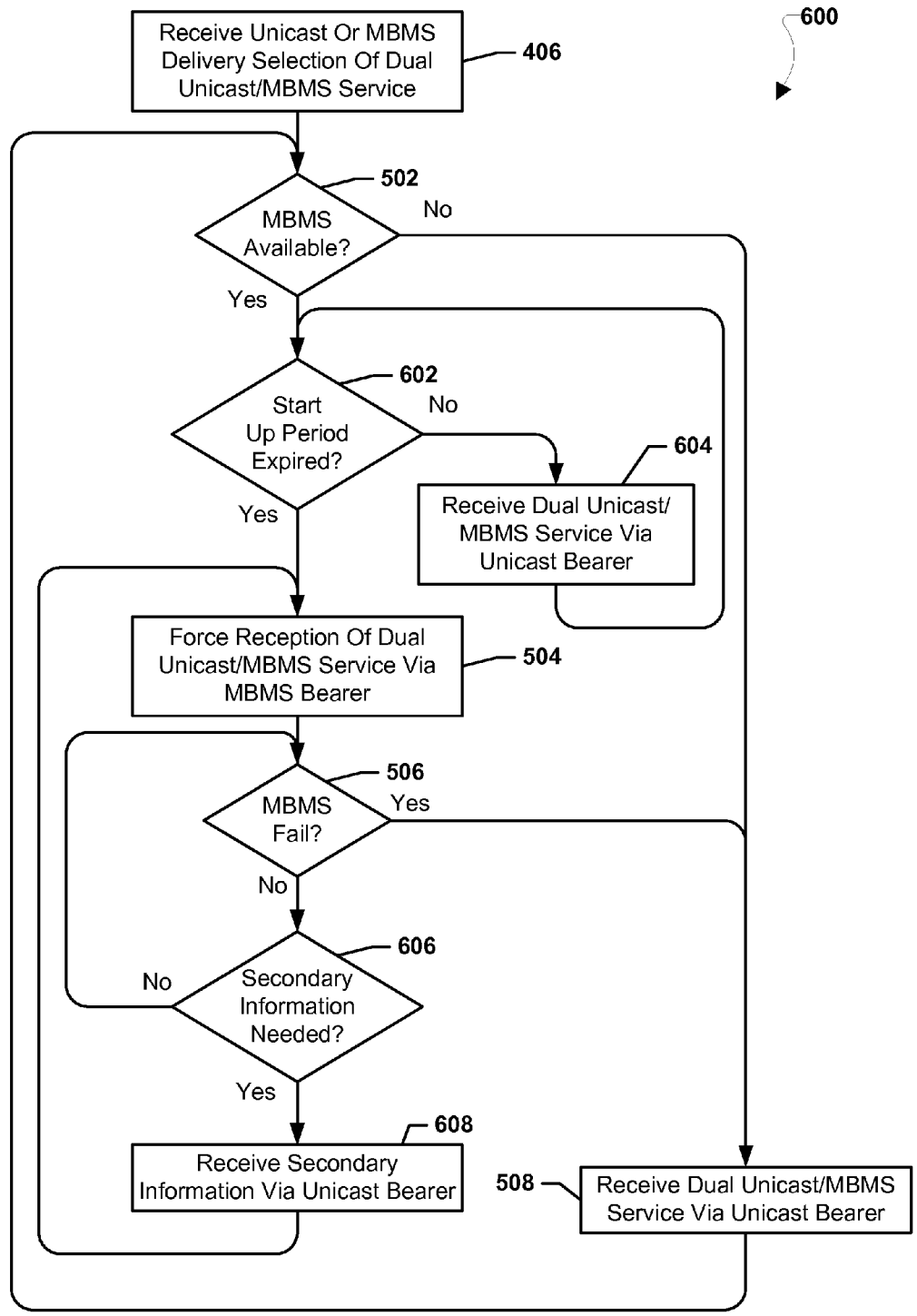
FIG. 6 is a process flow diagram illustrating an embodiment method for implementing network policy allowing for unicast reception during an MBMS start up period to control receiving a dual unicast/MBMS service via a unicast bearer or MBMS bearer.

FIG. 6 illustrates an embodiment method 600 for implementing network policy allowing for unicast reception during an MBMS start up period to control receiving a dual unicast/MBMS service via a unicast bearer or MBMS bearer. In an embodiment, the operations of method 600 may be performed by the processor of a receiver in conjunction with the operations of methods 400 and/or 500 described above with reference to FIGS. 4 and 5, respectively.

As discussed above, the receiver device processor may receive a unicast or MBMS delivery selection of a dual unicast/MBMS service in block 406, and determine whether MBMS is available in determination block 502. In response to determining that MBMS is available (i.e., determination block 502="Yes"), the receiver device processor may determine whether a start up period for the service has expired in determination block 602. The startup period may be a duration of time after the initial selection of a service. The duration of the startup period may be selected based on network policy to enable the receiver device to receive initial segments of a service to start play out of the service. In response to determining that the startup period has not expired (i.e., determination block 602="No"), the receiver device processor may receive the dual unicast/MBMS service via the unicast bearer in block 604. In this manner, network policy may allow unicast delivery to be used to lower the start up time and may enable larger segments to be delivered via the MBMS bearer. Receipt of the service via unicast during start up may also lower the bandwidth requirements and improve the quality of experience of the multicast feed.

In response to determining that the startup period has expired (i.e., determination block 602="Yes"), as discussed above in block 504 the receiver device processor may force reception of the dual unicast/MBMS service via the MBMS bearer and determine whether MBMS has failed in determination block 506. In response to determining that MBMS has not failed (i.e., determination block 506="No"), the receiver device processor may determine whether secondary information for the service is needed in block 606. Secondary information may be auxiliary components of the service, such as subtitles. In response to determining that secondary information is not needed (i.e., determination block 606="No"), the receiver device processor may continue to determine whether MBMS has failed in determination block 506.

In response to determining that secondary information is needed (i.e., determination block 606="Yes"), the receiver device processor may receive the secondary information via the unicast bearer in block 608, and force the reception of the dual unicast/MBMS service via the MBMS bearer in block 504. In this manner, network policy may allow the unicast bearer to be used to collect the secondary information, such as subtitles of the service, while still forcing the MBMS bearer to be used for the primary information, such as video segments, or the service. As discussed above, in response to determining that MBMS fails (i.e., determination block 506="Yes"), the receiver device processor may receive the dual unicast/MBMS service via the unicast bearer in block 508.

Figure 7:
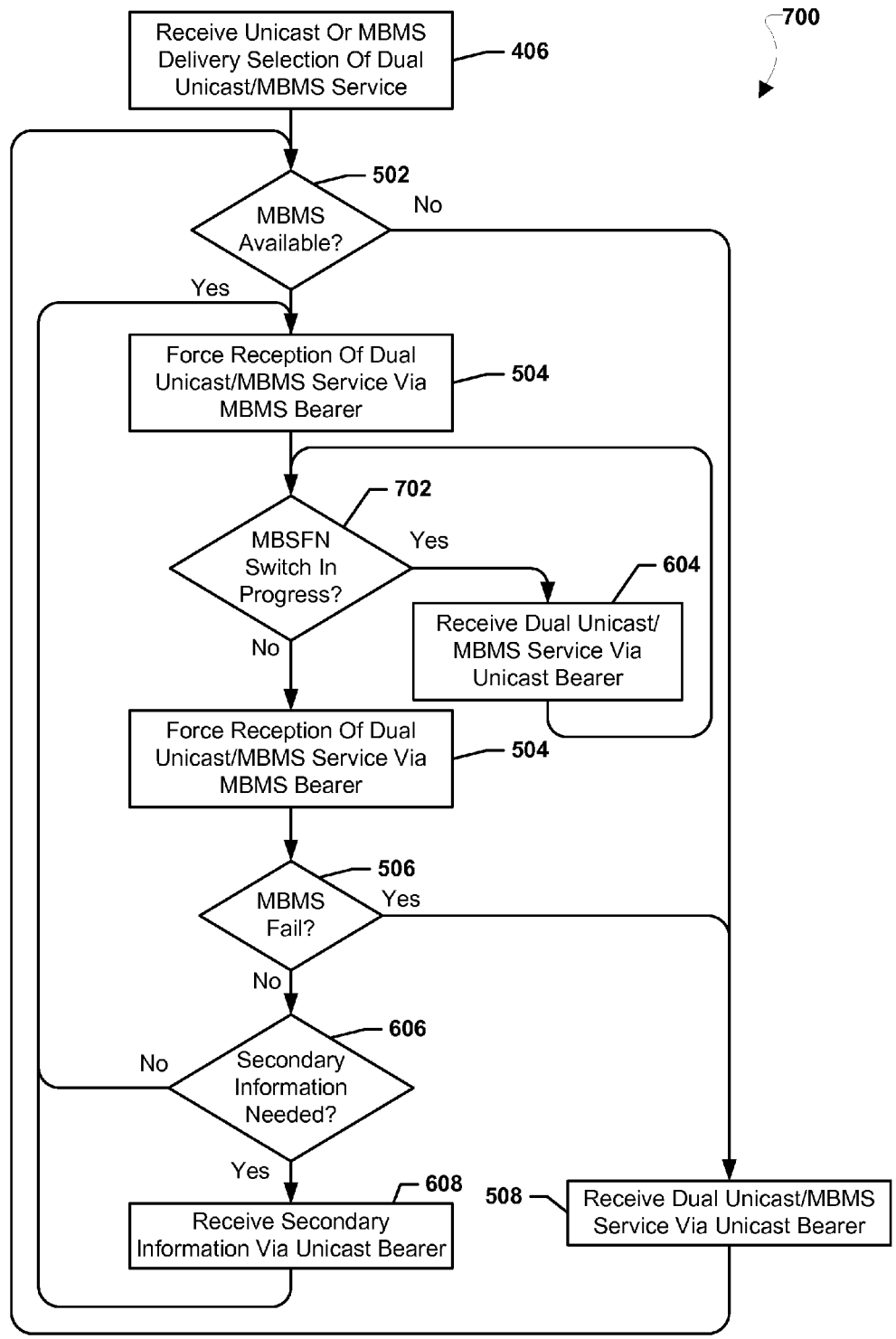
FIG. 7 is a process flow diagram illustrating an embodiment method for implementing network policy allowing for unicast reception during MBSFN switching to control receiving a dual unicast/MBMS service via a unicast bearer or MBMS bearer.

FIG. 7 illustrates an embodiment method 700 for implementing network policy allowing for unicast reception during MBSFN switching to control receiving a dual unicast/MBMS service via a unicast bearer or MBMS bearer. In an embodiment, the operations of method 700 may be performed by the processor of a receiver device in conjunction with the operations of methods 400, 500, and/or 600 described above with reference to FIGS. 4, 5, and 6, respectively.

As discussed above, the receiver device processor may receive a unicast or MBMS delivery selection of a dual unicast/MBMS service in block 406, and determine whether MBMS is available in determination block 502. As discussed above, in response to determining that MBMS is available (i.e., determination block 502="Yes"), the receiver device processor may force reception of the dual unicast/MBMS service via the MBMS bearer in block 504.

In determination block 702 the receiver device processor may determine whether an MBSFN switch is in progress. For example, the receiver device processor may determine whether the receiver device is moving from one MBSFN area to another. As discussed above, in response to determining that an MBSFN switch is in progress (i.e., determination block 702="Yes"), the receiver device processor may receive the dual unicast/MBMS service via the unicast bearer in block 604. In this manner, network policy may allow the unicast bearer to be used when switching from one MBSFN area to another which may improve the quality of experience while the receiver device is moving across MBSFNs. As discussed above, in response to determining that an MBSFN switch is not in progress (i.e., determination block 702="No"), the receiver device may force reception of the dual unicast/MBMS service via MBMS bearer in block 504. In blocks 506, 606, 608, and 508 the receiver device processor may perform operations of like numbered blocks of method 600 described above with reference to FIG. 6.

Figure 8:
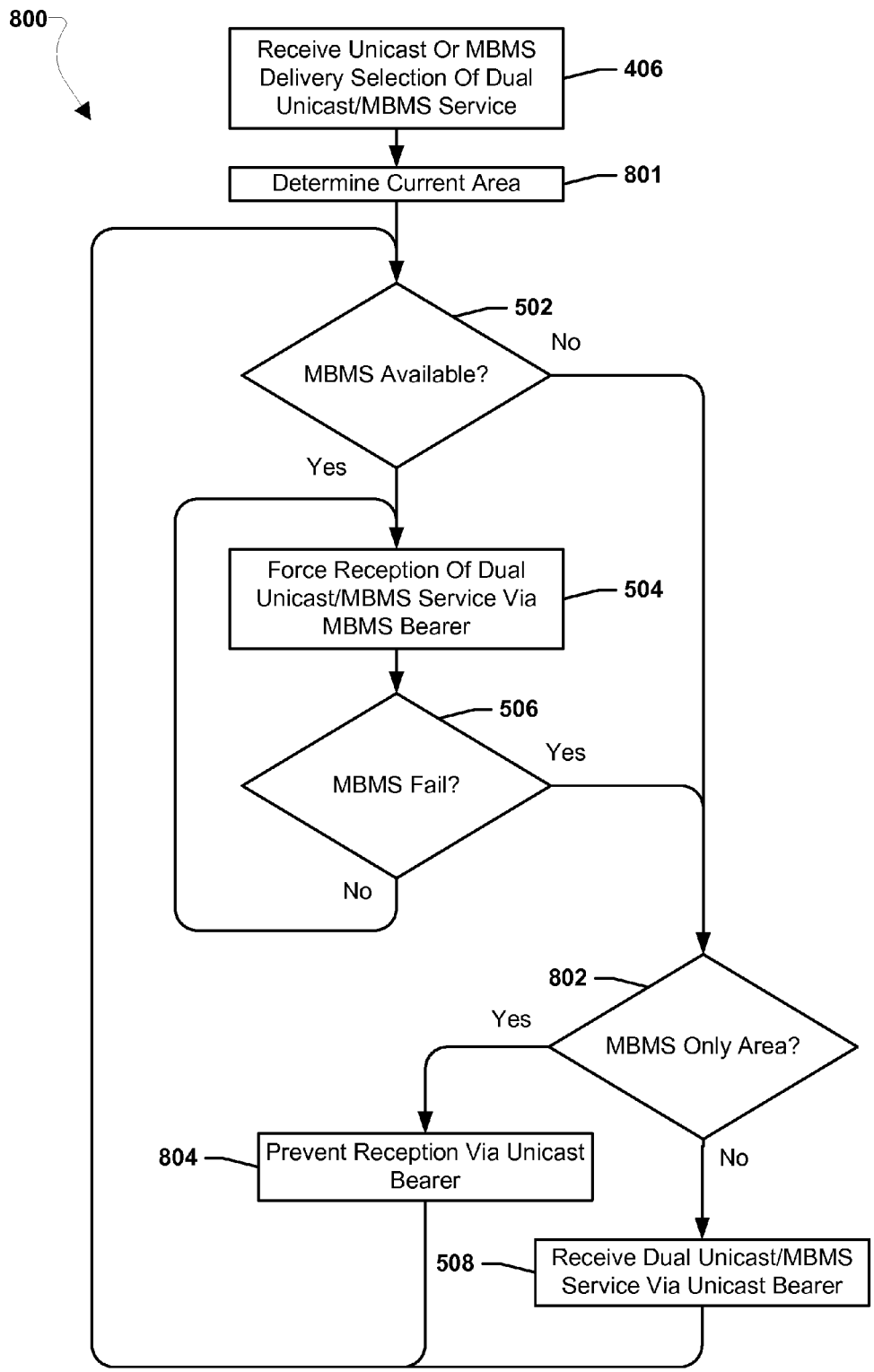
FIG. 8 is a process flow diagram illustrating an embodiment method for implementing network policy to control receiving a dual unicast/MBMS service via a unicast bearer or MBMS bearer based at least in part on an area restriction.

FIG. 8 illustrates an embodiment method for implementing network policy to control receiving a dual unicast/MBMS service via a unicast bearer or MBMS bearer based at least in part on an area restriction. In an embodiment, the operations of method 800 may be performed by the processor of a receiver device in conjunction with the operations of methods 400, 500, 600 and/or 700 described above with reference to FIGS. 4, 5, 6, and 7 respectively.

As discussed above, in block 406 the receiver device processor may receive a unicast or MBMS delivery selection of a dual unicast/MBMS service. In block 801 the receiver device processor may determine the area within the communication network in which it is currently located ("current area"). The current area may be the venue, MBSFN, cell, local area, service area, or other network defined location in which the receiver device is currently located. As discussed above, in determination block 502 the receiver device processor may determine whether MBMS is available. As discussed above, in response to determining that MBMS is available (i.e., determination block 502="Yes"), the receiver device processor may force reception of the dual unicast/MBMS service via the MBMS bearer in block 504, and determine whether MBMS has failed in determination block 506.

In response to determining that MBMS is not available (i.e., determination block 502="No") or that MBMS has failed (i.e., determination block 506="Yes"), the receiver device may determine whether the current network area is a MBMS-only area in determination block 802. An MBMS-only area may be a network area in which receiver devices may be restricted to only using the MBMS bearer to receive the dual unicast/MBMS service regardless of whether the unicast bearer is available or not. In response to determining that the current network area is an MBMS-only area (i.e., determination block 802="Yes"), the receiver device processor may prevent reception of the service via the unicast bearer in block 804. In this manner, even though unicast delivery may be selected and/or MBMS may not be available, network policy may prevent the unicast bearer from being used to receive the service. As discussed above, in response to determining that the current area is not MBMS-only (i.e., determination block 802="No"), the receiver device processor may receive the dual unicast/MBMS service via the unicast bearer in block 508.

Figure 9:
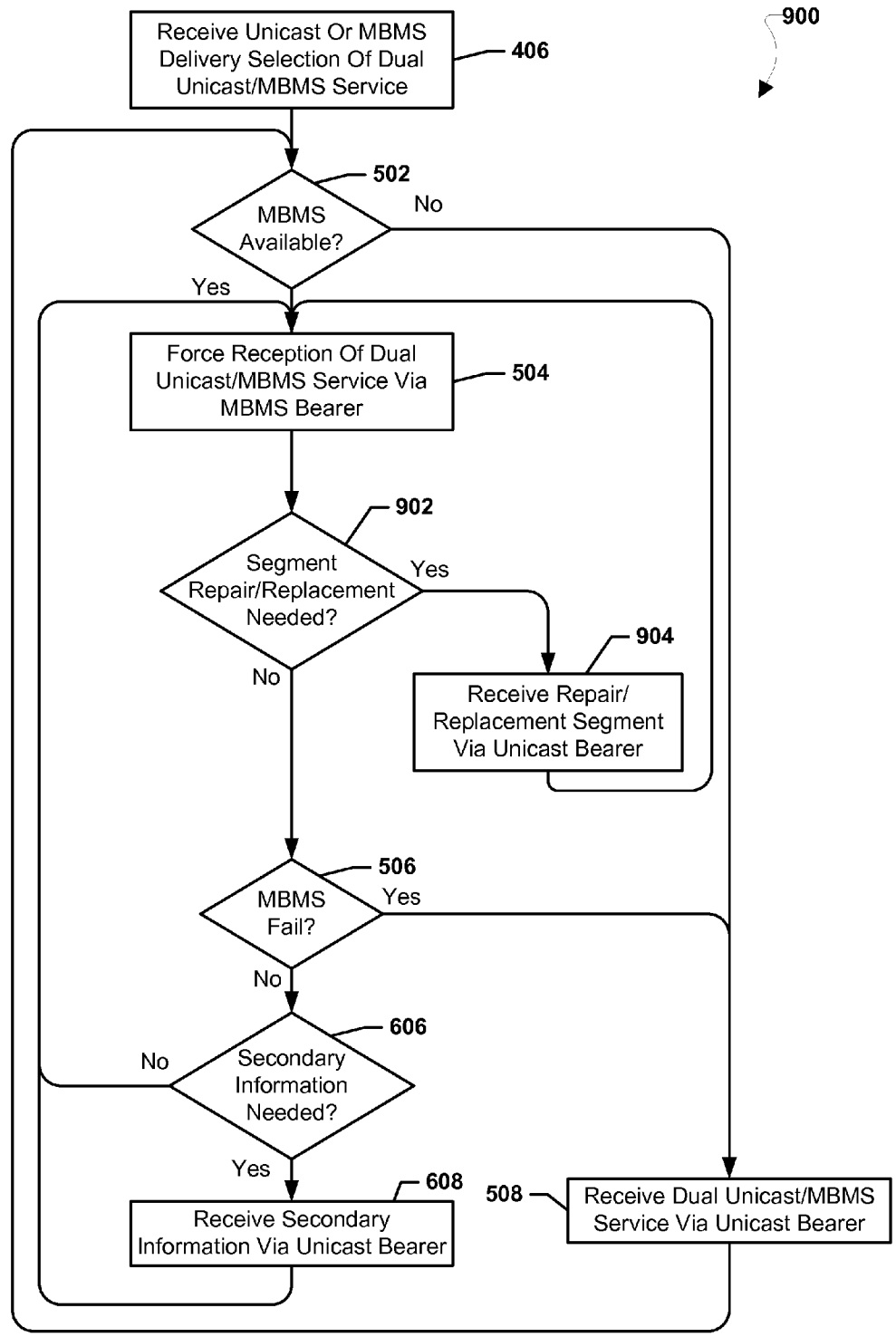
FIG. 9 is a process flow diagram illustrating an embodiment method for implementing network policy to control receiving a dual unicast/MBMS service via a unicast bearer or MBMS bearer and receiving repair and/or replacement segments via a unicast bearer.

FIG. 9 illustrates an embodiment method 900 for implementing network policy to control receiving a dual unicast/MBMS service via a unicast bearer or MBMS bearer and receiving repair and/or replacement segments via a unicast bearer. In an embodiment, the operations of method 900 may be performed by the processor of a receiver device in conjunction with the operations of methods 400, 500, 600, 700, and/or 800 described above with reference to FIGS. 4, 5, 6, 7, and 8, respectively.

As discussed above, the receiver device processor may receive a unicast or MBMS delivery selection of a dual unicast/MBMS service in block 406, and determine whether MBMS is available in determination block 502. As discussed above, in response to determining that MBMS is available (i.e., determination block 502="Yes"), the receiver device processor may force reception of the dual unicast/MBMS service via the MBMS bearer in block 504.

In determination block 902 the receiver device processor may determine whether segment repair and/or replacement is needed. Segment repair may be needed when a downloaded segment may be repaired, for example using forward error correction, by downloading additional information for the segment (e.g., a repair segment). Segment replacement may be needed when a segment cannot be repaired or is entirely missing, and a replacement segment of equal or lesser quality than the segment that is lost may be substituted for the lost segment. In response to determining that segment repair and/or replacement is needed (i.e., determination block 902="Yes"), the repair and/or replacement segment may be downloaded via the unicast bearer in block 904, and the receiver device processor may continue to force reception of the dual unicast/MBMS service via the MBMS bearer in block 504. In this manner, network policy may allow on-the-fly segment repair and/or replacement via the unicast bearer. In response to determining that segment repair/replacement is not needed (i.e., determination block 902="No"), the receiver device processor may perform operations of like numbered blocks 506, 606, 608, and 508 of method 600 described above with reference to FIG. 6.

Figure 10:
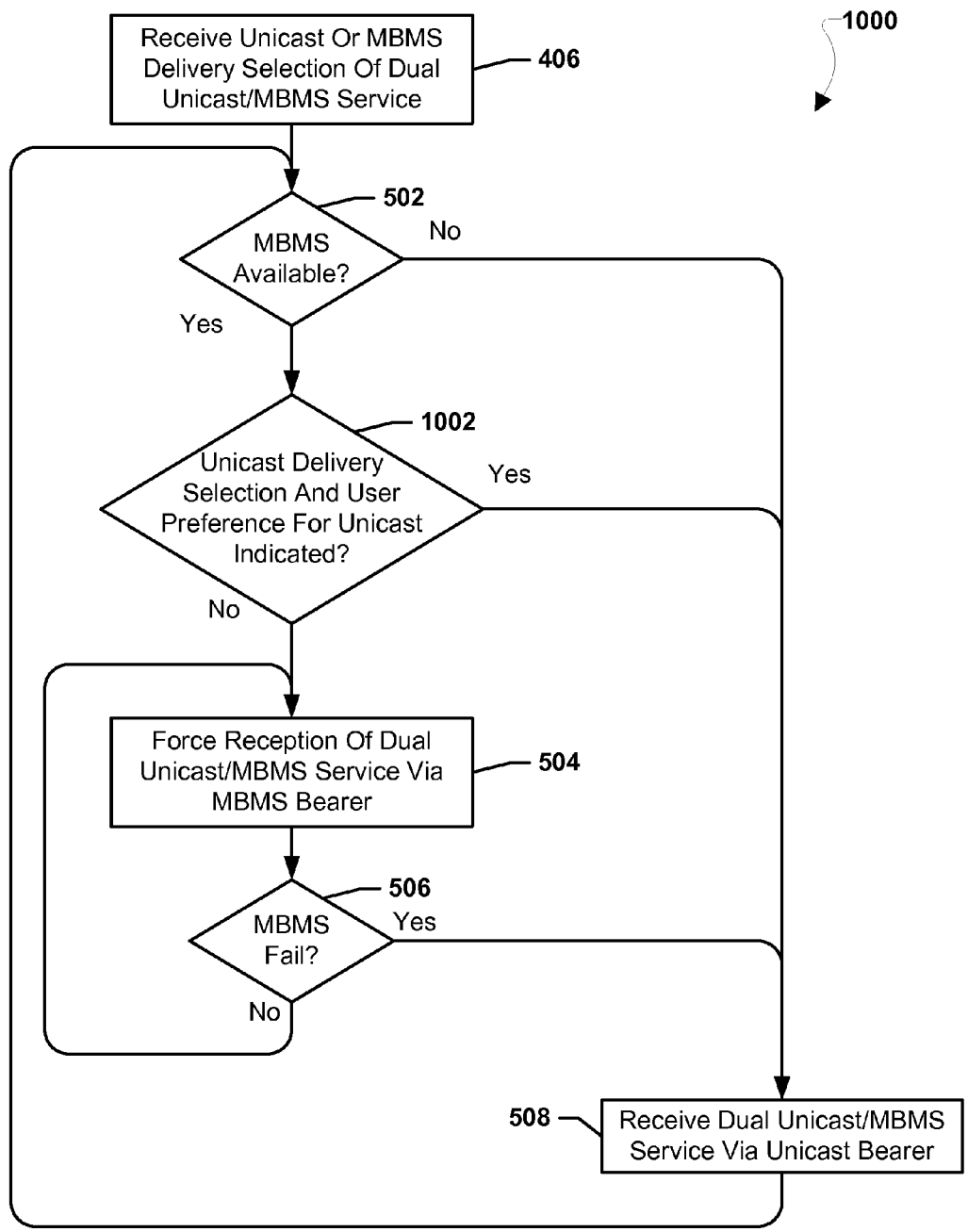
FIG. 10 is a process flow diagram illustrating an embodiment method for implementing network policy to control receiving a dual unicast/MBMS service via a unicast bearer or MBMS bearer based at least in part on a user preference.

FIG. 10 illustrates an embodiment method 1000 for implementing network policy to control receiving a dual unicast/MBMS service via a unicast bearer or MBMS bearer based at least in part on a user preference. In an embodiment, the operations of method 1000 may be performed by the processor of a receiver device in conjunction with the operations of methods 400, 500, 600, 700, 800 and/or 900 described above with reference to FIGS. 4, 5, 6, 7, 8, and 9, respectively.

As discussed above, the receiver device processor may receive a unicast or MBMS delivery selection of a dual unicast/MBMS service in block 406, and determine whether MBMS is available in determination block 502. In response to determining that MBMS is available (i.e., determination block 502="Yes"), the receiver device processor may determine whether the selection was a unicast delivery selection for the service and a user preference for unicast is indicated in determination block 1002. In an embodiment, a user preference for unicast may be indicated by a user indicating a willingness to pay more to use the unicast service, either through an affirmative selection when launching the service or through an elevated service plan, such as being a gold member paying more to use unicast than silver members who may not use unicast. In response to determining that unicast delivery was selected and the user preference for unicast is indicated (i.e., determination block 1002="Yes"), the receiver device processor may receive the dual unicast/MBMS service via the unicast bearer in block 508. In this manner, network policy may enable unicast delivery to users willing to pay for unicast delivery. In response to determining that unicast delivery is not selected or a user preference for unicast is not indicated (i.e., determination block 1002="No"), the receiver device processor may perform operations of like numbered blocks 504 and 506 of method 500 described above with reference to FIG. 5.

Figure 11:
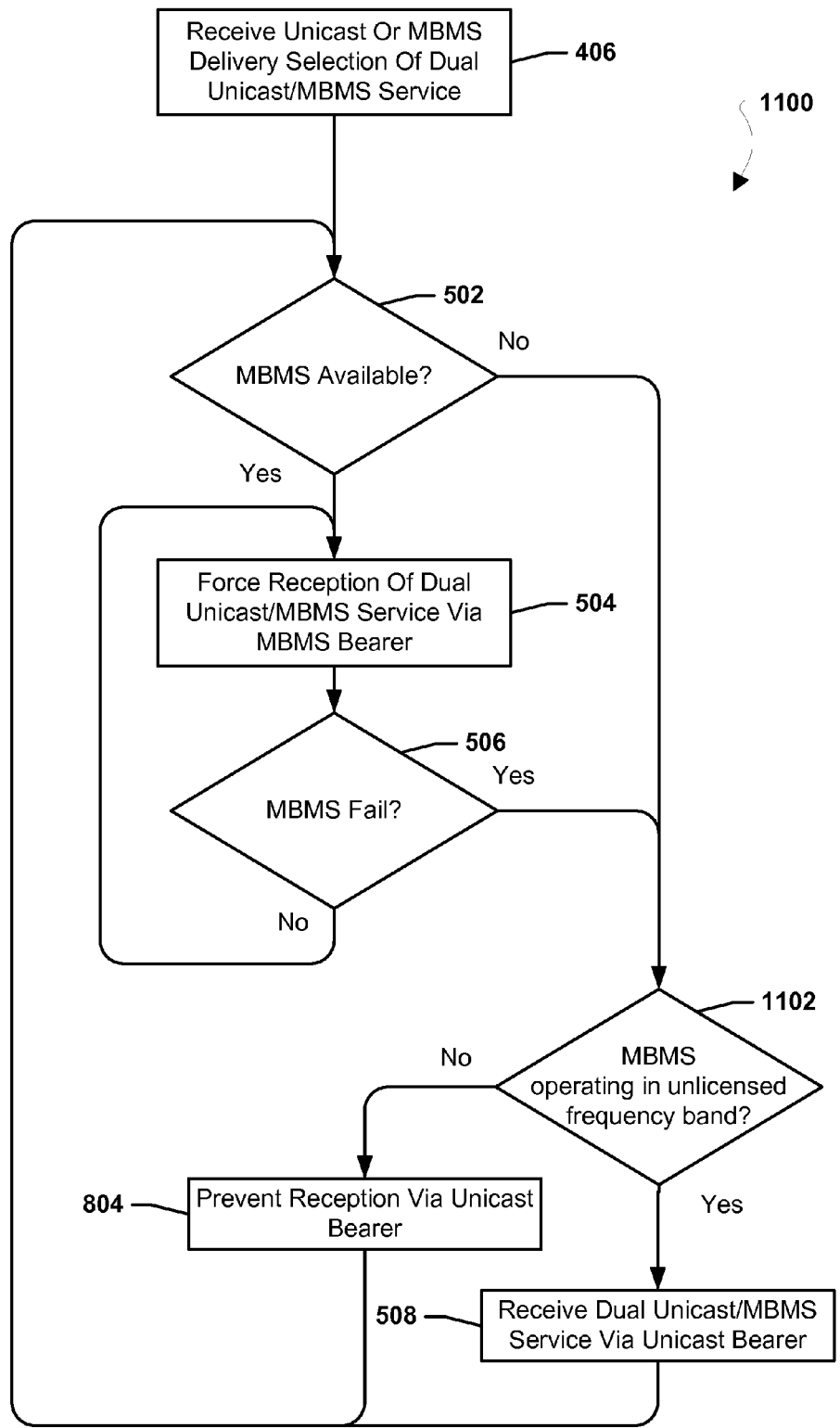
FIG. 11 is a process flow diagram illustrating an embodiment method for implementing network policy to control receiving a dual unicast/MBMS service via a unicast bearer or MBMS bearer based at least in part on the MBMS service being available in an unlicensed band.

FIG. 11 illustrates an embodiment method 1100 for implementing network policy to control receiving a dual unicast/MBMS service via a unicast bearer or MBMS bearer based at least in part on the MBMS service being available in an unlicensed band. In an embodiment, the operations of method 1100 may be performed by the processor of a receiver device in conjunction with the operations of methods 400, 500, 600, 700, 800, 900, and/or 1000 described above with reference to FIGS. 4, 5, 6, 7, 8, 9, and 10, respectively.

As discussed above, the receiver device processor may receive a unicast or MBMS delivery selection of a dual unicast/MBMS service in block 406, and determine whether MBMS is available in determination block 502. In response to determining that MBMS is available (i.e., determination block 502="Yes"), the receiver device processor may perform operations of like numbered blocks 504 and 506 of method 500 described above with reference to FIG. 5. In response to determining that MBMS is not available (i.e., determination block 502="No") or MBMS fails (i.e., determination block 506="Yes"), the receiver device processor may determine whether MBMS is delivered in an unlicensed frequency band in determination block 1102. For example, the receiver device may determine whether the MBMS bearer is operating in a Wi-Fi® unlicensed band. In response to determining that MBMS is in an unlicensed frequency band (i.e., determination block 1102="Yes"), the receiver device processor may receive the dual unicast/MBMS service via the unicast bearer in block 508. In this manner, network policy may enable unicast delivery when the MBMS bearer is in an unlicensed frequency band. In response to determining that MBMS is in a licensed frequency band (i.e., determination block 1102="No"), the receiver device processor may prevent the reception of the dual unicast/MBMS service in block 804 as described above with reference to FIG. 8.

Figure 12:
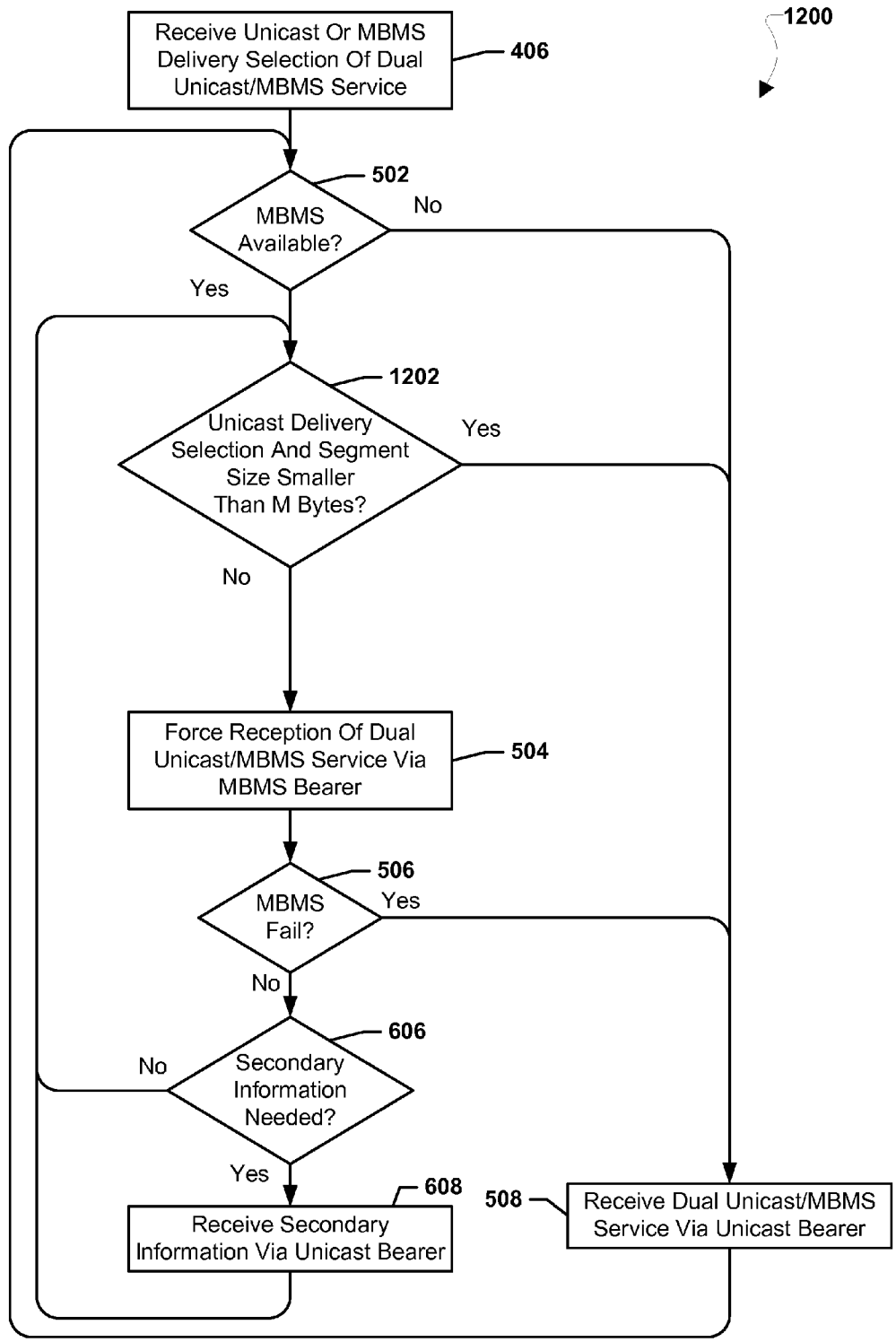
FIG. 12 is a process flow diagram illustrating an embodiment method for implementing network policy to control receiving a dual unicast/MBMS service via a unicast bearer or MBMS bearer based at least in part on segment size.

FIG. 12 illustrates an embodiment method 1200 for implementing network policy to control receiving a dual unicast/MBMS service via a unicast bearer or MBMS bearer based at least in part on segment size. In an embodiment, the operations of method 1200 may be performed by the processor of a receiver device in conjunction with the operations of methods 400, 500, 600, 700, 800, 900, 1000, and/or 1100 described above with reference to FIGS. 4, 5, 6, 7, 8, 9, 10, and 11, respectively.

As discussed above, the receiver device processor may receive a unicast or MBMS delivery selection of a dual unicast/MBMS service in block 406, and determine whether MBMS is available in determination block 502. In response to determining that MBMS is available (i.e., determination block 502="Yes"), the receiver device processor may determine whether unicast delivery is selected and a segment size of the service is smaller than a byte threshold M in determination block 1202. For example, the receiver device processor may determine whether an average segment size in bytes for the service is smaller than M. In response to determining that unicast delivery is selected and the segment size is smaller than M (i.e., determination block 1202="Yes"), the receiver device processor may receive the dual unicast/MBMS service via the unicast bearer in block 508. In this manner, network policy may enable unicast delivery when the segments of a service are smaller than a threshold byte size. In response to determining that unicast delivery is not selected or the segment size is not smaller than M (i.e., determination block 1202="No"), the receiver device processor may perform operations of like numbered blocks 504, 506, 606, and 608 of method 600 described above with reference to FIG. 6.

Figure 13:
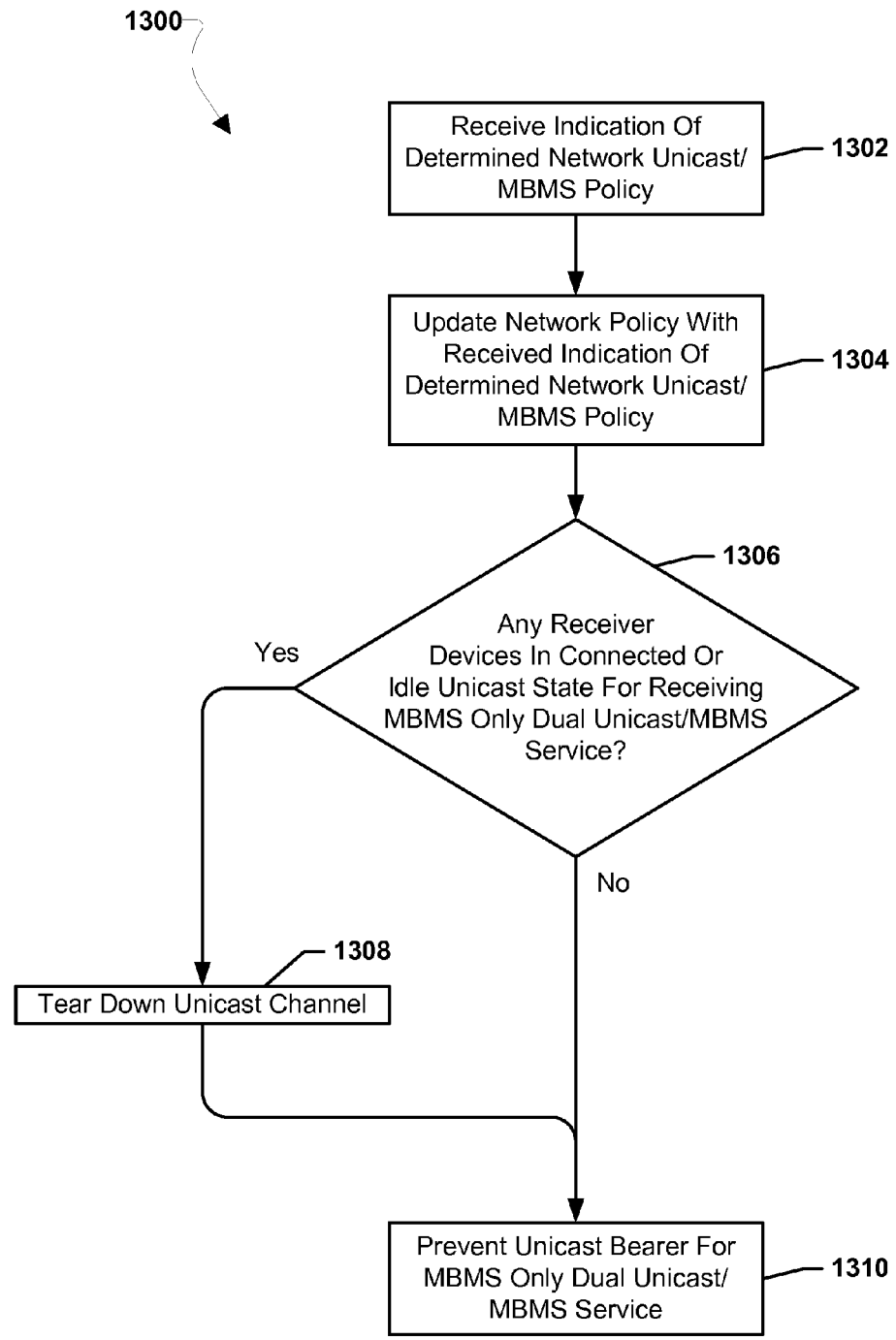
FIG. 13 is a process flow diagram illustrating an embodiment method for implementing network policy to control establishing connections for a dual unicast/MBMS service.

FIG. 13 illustrates an embodiment method 1300 for implementing network policy to control establishing connections for a dual unicast/MBMS service. In an embodiment, the operations of method 1300 may be performed by the processor of an eNB in conjunction with the operations of methods 400, 500, 600, 700, 800, 900, 1000, 1100, and/or 1200 described above with reference to FIGS. 4, 5, 6, 7, 8, 9, 10, 11, and 12, respectively.

In block 1302 the eNB processor may receive an indication of the determined network unicast/MBMS policy and in block 1304 the eNB processor may update the network policy with the received indication of the determined network unicast MBMS policy. In determination block 1306 the eNB processor may determine whether any receiver devices are in a connected or idle unicast state for receiving an MBMS only dual unicast/MBMS service. For example, network policy may designate one or more service an MBMS only dual unicast/MBMS service which receiver devices are only to receive via the MBMS bearer. In response to determining that the eNB processor determines that any receiver device is in a connected or idle state for receiving the MBMS only dual unicast/MBMS service (i.e., determination block 1306="Yes"), the eNB processor may tear down the unicast channel for each such connected or idle receiver device in block 1308. In this manner, network policy may prevent receiver devices from receiving a service via unicast channel from the eNB. In response to determining that the eNB processor determines that receiver devices are not in a connected or idle state for receiving the service (i.e., determination block 1306="No"), the eNB processor may prevent unicast bearers for the MBMS only dual unicast/MBMS service from being established in block 1310.

Figure 14:
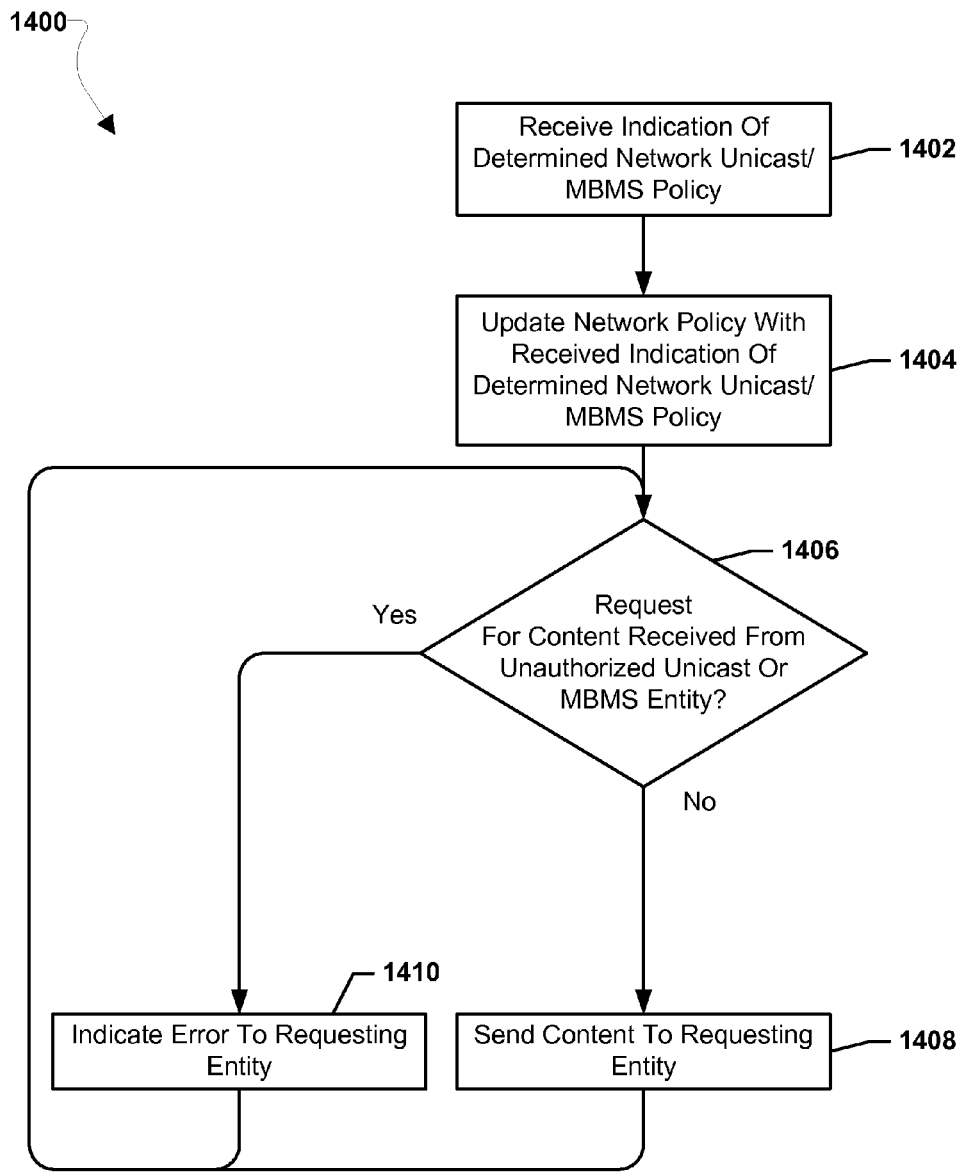
FIG. 14 is a process flow diagram illustrating an embodiment method for implementing network policy to control sending of content for a dual unicast/MBMS service.

FIG. 14 illustrates an embodiment method 1400 for implementing network policy to control sending of content for a dual unicast/MBMS service. In an embodiment, the operations of method 1400 may be performed by the processor of a content server in conjunction with the operations of methods 400, 500, 600, 700, 800, 900, 1000, 1100, 1200, and/or 1300 described above with reference to FIGS. 4, 5, 6, 7, 8, 9, 10, 11, 12, and 13, respectively.

In block 1402 the content server may receive an indication of the determined network unicast/MBMS policy, and in block 1404 the content server may update the network policy with the received indication of the determined network unicast MBMS policy. In determination block 1406 content server may determine whether a request for content is received from an unauthorized unicast or MBMS entity. In response to determining that the request is from an unauthorized entity (i.e., determination block 1406="Yes"), the content server may indicate an error to the requesting entity. In this manner, the content server may apply network policy to prevent sending of content to an unauthorized unicast or MBMS entity in block 1410. In response to determining that the request is from an authorized entity (i.e., determination block 1406="No"), the content server may send the requested content to the requesting entity in block 1408.

Figure 15:
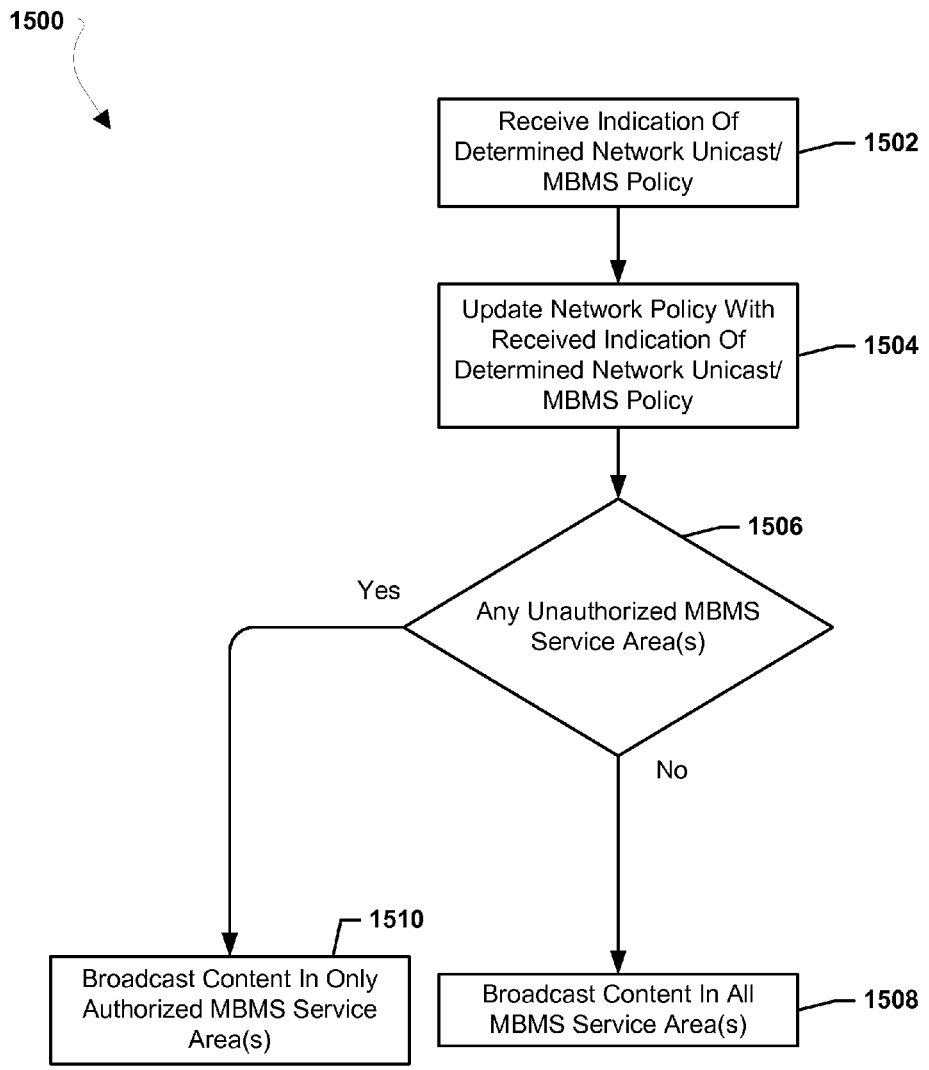
FIG. 15 is a process flow diagram illustrating an embodiment method for implementing network policy to control broadcasting of content for a dual unicast/MBMS service.

FIG. 15 illustrates an embodiment method 1500 for implementing network policy to control broadcasting of content for a dual unicast/MBMS service. In an embodiment, the operations of method 1500 may be performed by the processor of a BM-SC server in conjunction with the operations of methods 400, 500, 600, 700, 800, 900, 1000, 1100, 1200, 1300, and/or 1400 described above with reference to FIGS. 4, 5, 6, 7, 8, 9, 10, 11, 12, 13, and 14, respectively.

In block 1502 the BM-SC server may receive an indication of the determined network unicast/MBMS policy and in block 1504 the BM-SC server may update the network policy with the received indication of the determined network unicast MBMS policy. In determination block 1506 the BM-SC server may determine whether there are any unauthorized MBMS service areas based on the network policy. In response to determining that there are unauthorized MBMS service areas (i.e., determination block 1506="Yes"), the BM-SC server may broadcast content in only authorized MBMS service areas in block 1510. In this manner, network policy may be implemented by the BM-SC to control whether or not to send MBMS in service areas. In response to determining that there are no unauthorized MBMS service areas (i.e., determination block 1506="No"), the BM-SC server may broadcast content in all MBMS service areas in block 1508.

Figure 16:
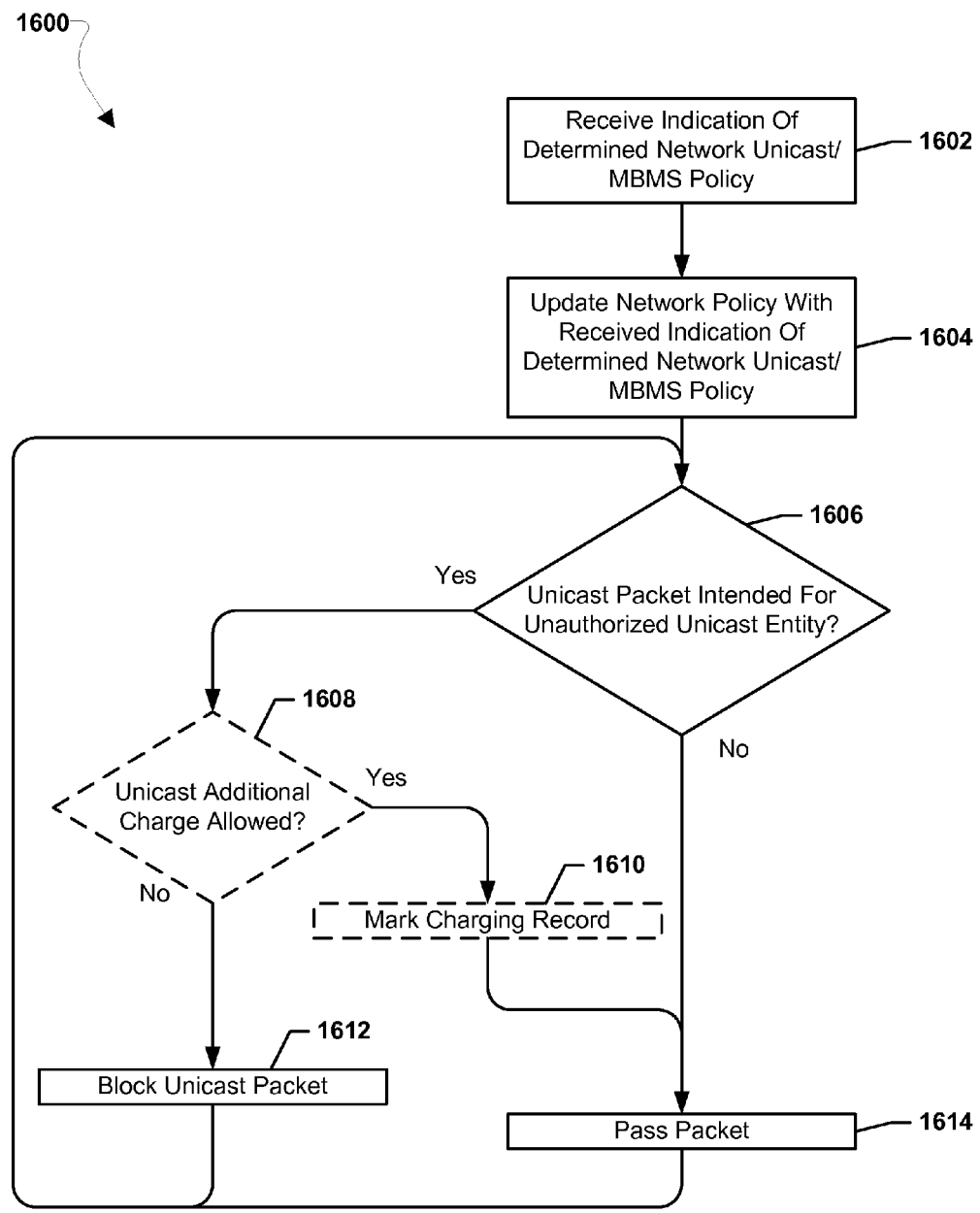
FIG. 16 is a process flow diagram illustrating an embodiment method for implementing network policy to control blocking of packets for a dual unicast/MBMS service.

FIG. 16 illustrates an embodiment method 1600 for implementing network policy to control blocking of packets for a dual unicast/MBMS service. In an embodiment, the operations of method 1600 may be performed by the processor of a P-GW server, TDF server, network proxy server, or DANE in conjunction with the operations of methods 400, 500, 600, 700, 800, 900, 1000, 1100, 1200, 1300, 1400, and/or 1500 described above with reference to FIGS. 4, 5, 6, 7, 8, 9, 10, 11, 12, 13, 14, and 15, respectively.

In block 1602 the P-GW TDF server, network proxy server, or DANE may receive an indication of the determined network unicast/MBMS policy and in block 1604 the P-GW TDF server, network proxy server, or DANE may update the network policy with the received indication of the determined network unicast MBMS policy. In determination block 1606 the P-GW TDF server, network proxy server, or DANE may determine whether a unicast packet is intended for an unauthorized unicast entity. In response to determining that the packet is intended for an unauthorized unicast entity (i.e., determination block 1606="Yes"), the P-GW TDF server, network proxy server, or DANE may block the unicast packet in block 1612. In this manner, network policy may prevent unicast packets from being delivered for a dual unicast/MBMS service. In response to determining that the packet is not intended for an unauthorized unicast entity (i.e., determination block 1606="No"), the P-GW TDF server, network proxy server, or DANE may pass the packet in block 1614.

In an optional embodiment, in response to determining that the packet is intended for an unauthorized unicast entity (i.e., determination block 1606="Yes"), the P-GW or TDF server may determine whether a unicast additional charge is allowed. A unicast additional charge may be allowed based on a user's service agreement, user indication to accept a charge, etc. In response to determining that an additional charge is not allowed (i.e., determination block 1608="No"), the P-GW or TDF server may block the unicast packet in block 1612. In response to determining that an additional charge is allowed (i.e., determination block 1608="Yes"), the P-GW or TDF server may mark a charging record in block 1610, and pass the packet in block 1614.

Figure 17:
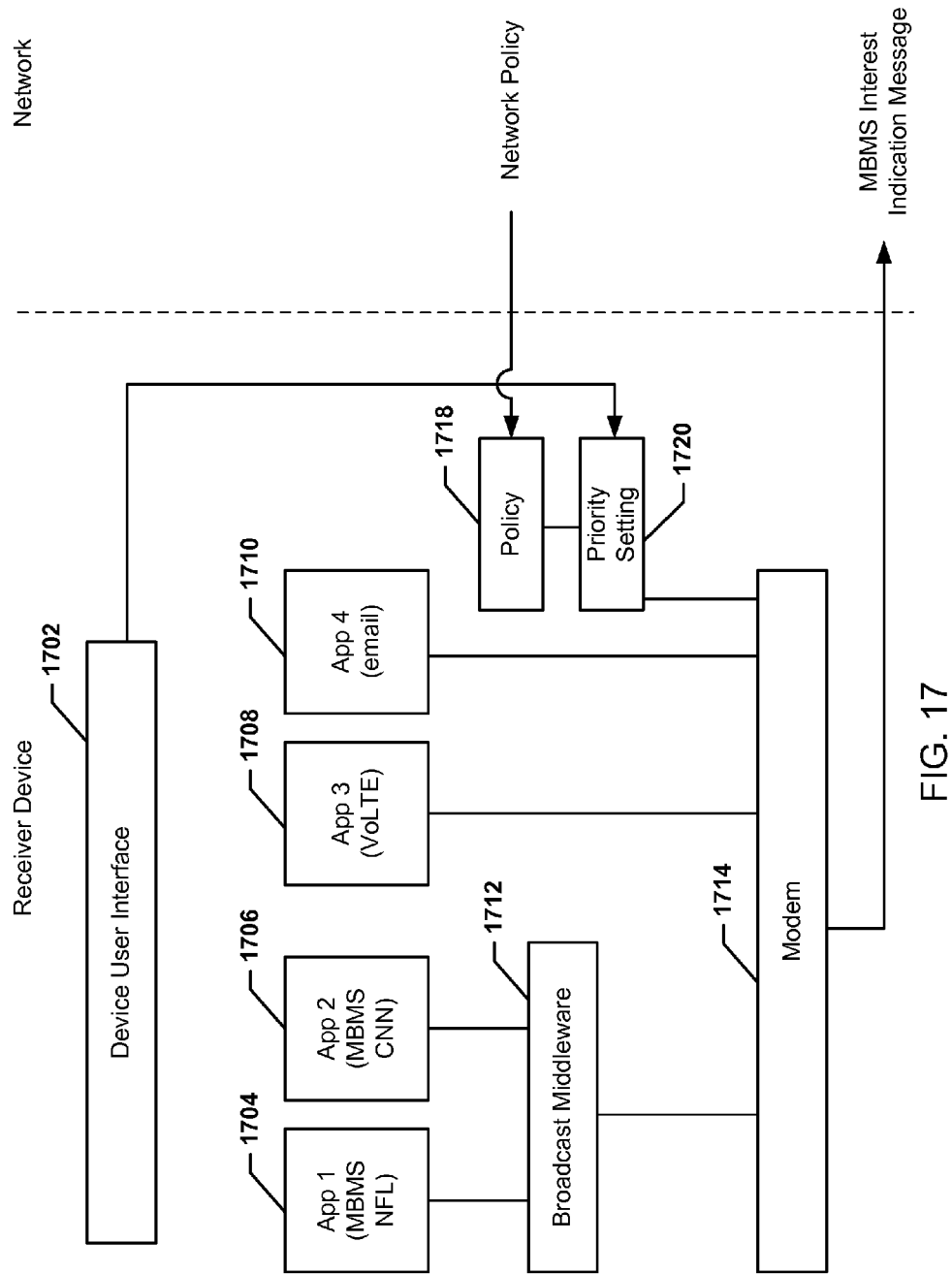
FIG. 17 is a block diagram of receiver device and network architecture according to another embodiment.

FIG. 17 is a functional block diagram of receiver device and network architecture according to another embodiment. The receiver device may include a device user interface 1702 that may interface with a priority setting module 1720. Through the device user interface 1702 the user of the device may indicate user priority settings and user priority settings updates. The device user interface 1702 may set priority statically or dynamically based on different activated applications or charging rules. The receiver device may also include a policy module 1718 that may facilitate the download of network policy. Alternatively, network policy may be preconfigured on the receiver device. Network policy may allow the device user interface 1702 to setup/override default priorities temporarily or permanently, may enable manufactures to set priority, and/or may be based on network loading or service type. The priority setting module 1720 may interface with the policy module 1718 and the modem 1714 to set priorities between MBMS and unicast for the modem. The modem 1714 may also send MBMS interest indication messages to the network in the connected state.

The receiver device may include a number of applications, such as an MBMS NFL application 1704, a MBMS CNN application 1706, a Voice over LTE ("VoLTE") application 1708, and an email application 1710. For example, the MBMS NFL application 1704 and MBMS CNN application 1706 may interface with broadcast middleware 1712, which may interface with the modem 1714. The VoLTE application 1708 and email application 1710 may directly interface with the modem.

In a first scenario the user may start the MBMS NFL application 1704 in idle and the priority settings may cause the modem 1714 to set the priority for MBMS to high. The MBMS NFL application 1704 may register with the broadcast middleware 1712, which may activate the TMGI for the application with the modem. The modem may send an MBMS interest indication message to the network indicating that MBMS has the highest priority. At a later time when the VoLTE application 1708 is started to make a telephone call the modem may enter a connected unicast state and the priority may shift to unicast being highest priority. The modem 1714 may send an updated MBMS interest indication message to the network.

In another scenario, the user may start the MBMS NFL application 1704 in idle and the priority settings may cause the modem 1714 to set the priority for MBMS to high. The MBMS NFL application 1704 may register with the broadcast middleware 1712 which may activate the TMGI for the application with the modem. The modem may send an MBMS interest indication message to the network indicating that MBMS has the highest priority. At a later time the email application 1710 may be started to view e-mails and the receiver device may enter the connected state. The receiver device may not change priority because the email application 1710 may have a lower priority than the MBMS NFL application 1704.

Figure 18:
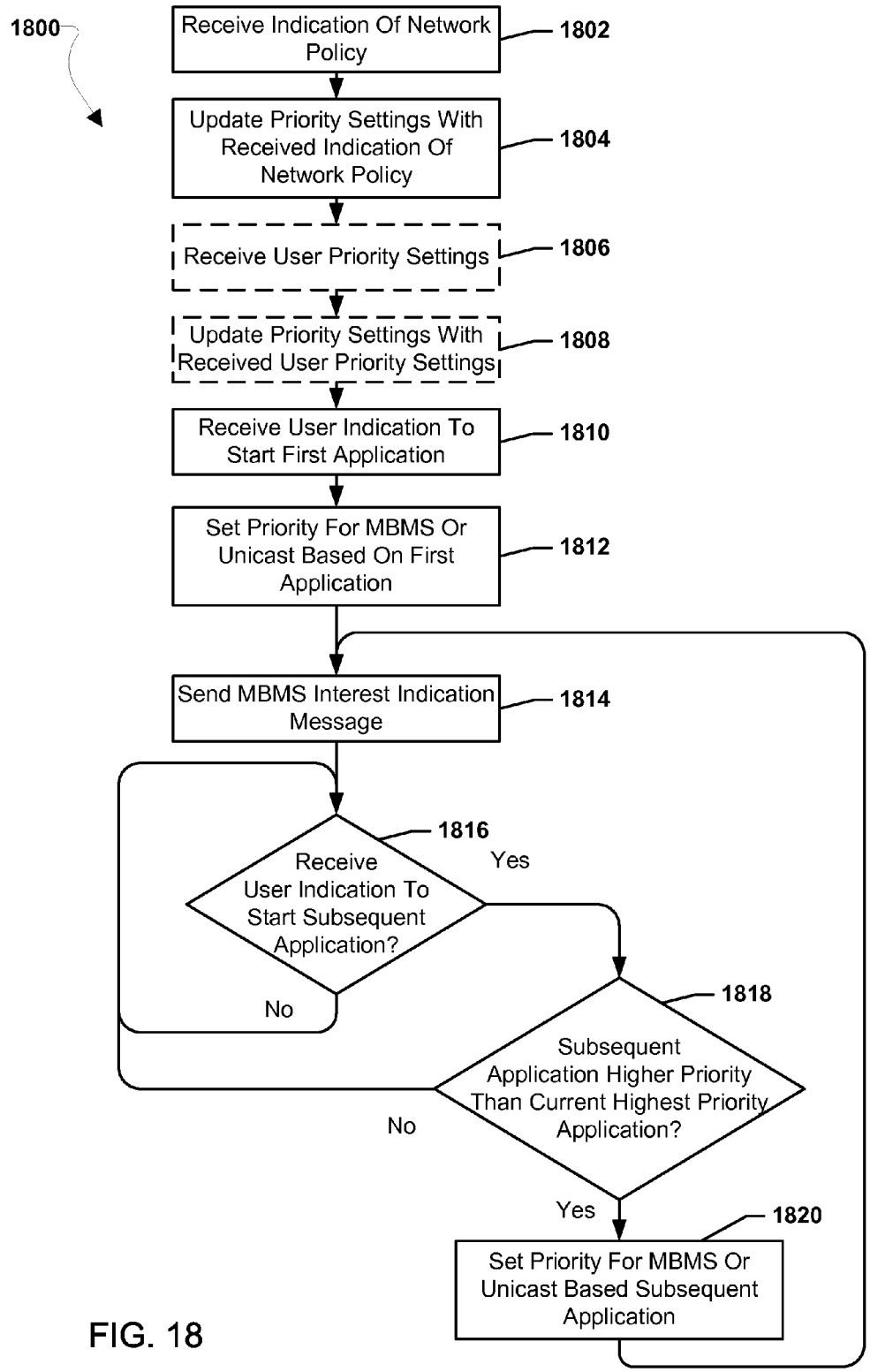
FIG. 18 is a process flow diagram illustrating an embodiment method for indicating unicast or MBMS priority.

FIG. 18 illustrates an embodiment method 1800 for indicating unicast or MBMS priority. In an embodiment, the operations of method 1800 may be performed by a processor of a receiver device. In block 1802 the receiver device processor may receive an indication of network policy. In block 1804 the receiver device processor may update priority settings with the received indication of network policy. In optional block 1806 the receiver device processor may receive user priority settings. In optional block 1808 the receiver device processor may update the priority settings with the received user priority settings.

In block 1810 the receiver device processor may receive a user indication to start a first application. In block 1812 the receiver device processor may set a priority for MBMS or unicast based on the first application. In block 1814 the receiver device processor may send an MBMS interest indication message to the network indicating the priority setting for MBMS or unicast. In determination block 1816 the receiver device processor may determine whether a user indication to start a subsequent application is received. In response to determining that an indication to start a subsequent application is not received (i.e., determination block 1816="No"), the receiver device processor may continue to monitor for the start of subsequent applications in determination block 1816.

In response to determining that a user indication to start a subsequent application is received (i.e., determination block 1816="Yes"), the receiver device processor may determine whether the subsequent application has a higher priority than the current highest priority application in block 1818. In response to determining that the priority of the subsequent application is not higher (i.e., determination block 1818="No"), the receiver device processor may continue to monitor for the start of subsequent applications in determination block 1816. In response to determining that the priority of the subsequent application is higher (i.e., determination block 1818="Yes"), the receiver device processor may set the priority for MBMS or unicast based on the subsequent application in block 1820, and send an MBMS interest indication message in block 1814.

Figure 19:
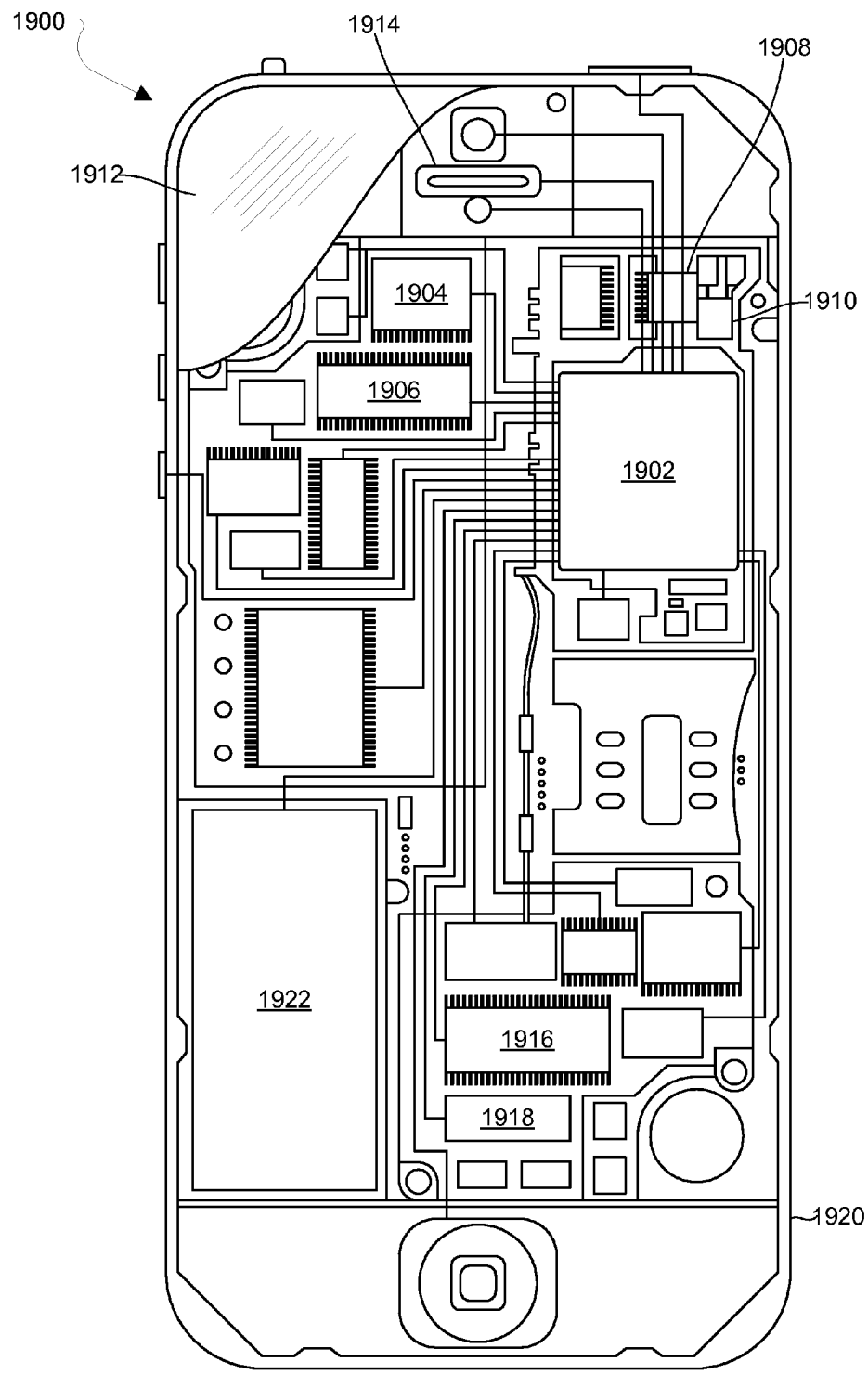
FIG. 19 is a component diagram of an example receiver device suitable for use with the various embodiments.

The various embodiments (including, but not limited to, embodiments discussed above with reference to FIGS. 2, 4-16, and 18) may be implemented in any of a variety of receiver devices, an example of which is illustrated in FIG. 19. For example, the receiver device 1900 may include a processor 1902 coupled to internal memories 1904 and 1906. Internal memories 1904 and 1906 may be volatile or non-volatile memories, and may also be secure and/or encrypted memories, or unsecure and/or unencrypted memories, or any combination thereof. The processor 1902 may also be coupled to a touch screen display 1912, such as a resistive-sensing touch screen, capacitive-sensing touch screen infrared sensing touch screen, or the like. Additionally, the display of the receiver device 1900 need not have touch screen capability. The receiver device 1900 may have one or more radio signal transceivers 1908 (e.g., Peanut®, Bluetooth®, Zigbee®, Wi-Fi, RF radio) and antennae 1910, for sending and receiving, coupled to each other and/or to the processor 1902. The receiver device 1900 may include a wireless network interface, such as wireless modem chip 1916, that enables broadcast and/or unicast communication via a wireless data network (e.g., CDMA, TDMA, GSM, PCS, 3G, 4G, LTE, Wi-Fi, and/or any other type of wireless data network) and is coupled to the processor 1902. The receiver device 1900 may include a peripheral device connection interface 1918 coupled to the processor 1902. The peripheral device connection interface 1918 may be singularly configured to accept one type of connection, or multiply configured to accept various types of physical and communication connections, common or proprietary, such as USB, FireWire, Thunderbolt, or PCIe. The peripheral device connection interface 1918 may also be coupled to a similarly configured peripheral device connection port. The receiver device 1900 may also include speakers 1914 for providing audio outputs. The receiver device 1900 may also include a housing 1920, constructed of a plastic, metal, or a combination of materials, for containing all or some of the components discussed herein. The receiver device 1900 may include a power source 1922 coupled to the processor 1902, such as a disposable or rechargeable battery. The rechargeable battery may also be coupled to the peripheral device connection port to receive a charging current from a source external to the receiver device 1900.

Figure 20:
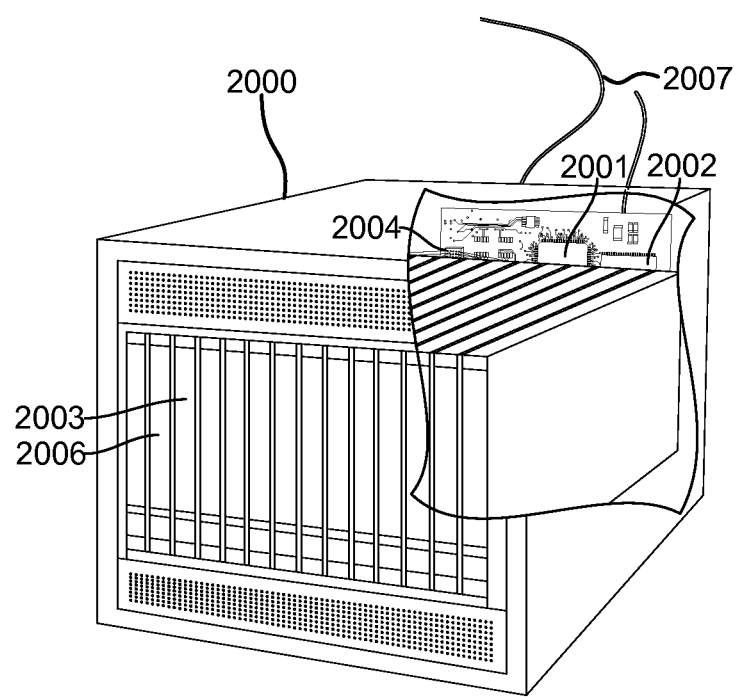
FIG. 20 is a component diagram of an example server suitable for use with the various embodiments.

The various embodiments (including, but not limited to, embodiments discussed above with reference to FIGS. 2, 4-16, and 18) may also be implemented on any of a variety of commercially available server devices, such as the server 2000 illustrated in FIG. 20. Such a server 2000 typically includes a processor 2001 coupled to volatile memory 2002 and a large capacity nonvolatile memory, such as a disk drive 2003. The server 2000 may also include a floppy disc drive, compact disc (CD) or DVD disc drive 2006 coupled to the processor 2001. The server 2000 may also include network access ports 2004 (e.g., a network interface) coupled to the processor 2001 for establishing network interface connections with a network 2007, such as a local area network coupled to other broadcast system computers and servers, the Internet, the public switched telephone network, and/or a wireless data network (e.g., CDMA, TDMA, GSM, PCS, 3G, 4G, LTE, Wi-Fi, and/or any other type of wireless data network).

Figure 21:
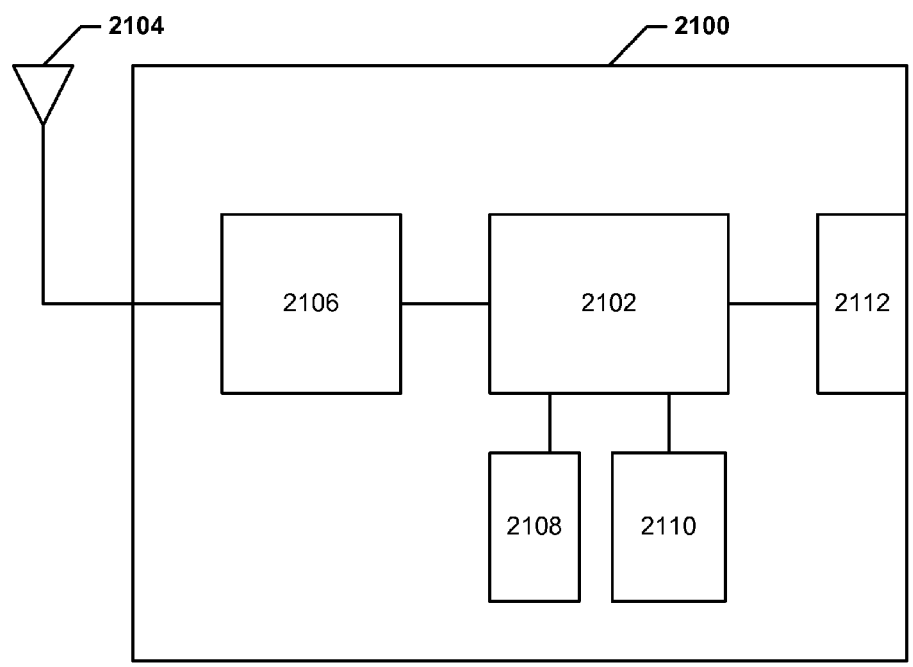
FIG. 21 is a component block diagram of an example tower or base station suitable of use with the various embodiments.

The various embodiments (including, but not limited to, embodiments discussed above with reference to FIGS. 2, 4-16, and 18) may also be implemented on any of a variety of commercially available towers or base stations, such as the eNB 2100 illustrated in FIG. 21. Such an eNB 2100 typically includes a processor 2102 coupled to volatile memory 2108 and a large capacity nonvolatile memory, such as a disk drive 2110. The eNB 2100 may include an antenna 2104 coupled to a transceiver 2106 that is coupled to the processor 2102. Via the antenna 2104 and transceiver 2106 (e.g., a network interface) the processor may send/receive unicast and/or broadcast transmissions (e.g., CDMA, TDMA, GSM, PCS, 3G, 4G, LTE, Wi-Fi, and/or any other type of unicast and/or broadcast transmissions) to/from receiver devices. The eNB 2100 may also include network access ports 2112 (e.g., a network interface) coupled to the processor 2102 for establishing network interface connections with a network, such as a local area network coupled to other broadcast system computers and servers, the Internet, the public switched telephone network, and/or a wireless data network (e.g., CDMA, TDMA, GSM, PCS, 3G, 4G, LTE, Wi-Fi, and/or any other type of wireless data network).

The processors 1902, 2001, and 2102 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 1902, 2001, and 2102. The processors 1902, 2001, and 2102 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1902, 2001, and 2102 including internal memory or removable memory plugged into the device and memory within the processor 1902, 2001, and 2102 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more processor executable instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A receiver device, comprising:
a wireless network interface; and
a processor coupled to the wireless network interface, the processor configured with processor executable instructions to perform operations comprising:
receiving an indication of a determined network unicast/broadcast policy via the network interface, wherein the determined network unicast/broadcast policy governs delivery of a service provided via a unicast bearer and a Multimedia Broadcast Multicast Service (MBMS) bearer in a communication network;
updating a network policy with the received indication of the determined network unicast/broadcast policy;
receiving a unicast or MBMS delivery selection for the service;
determining whether the MBMS bearer is available as a broadcast to the receiver device;
forcing the receiver device to transition to reception of the service via the MBMS bearer in response to determining that the MBMS bearer is available to the receiver device;
determining whether the MBMS bearer has failed after starting reception via the MBMS bearer; and
receiving the service via the unicast bearer in response to determining that the MBMS bearer has failed.

2. The receiver device of claim 1, wherein:
the processor is configured with processor executable instructions to perform operations further comprising:
determining whether the unicast or MBMS delivery selection for the service in the receiver device is a unicast delivery selection and a user preference for unicast is indicated; and
receiving the service via the unicast bearer in response to determining that the unicast or MBMS delivery selection for the service in the receiver device is a unicast delivery selection and a user preference for unicast is indicated; and
the processor is further configured with processor executable instructions to perform operations such that forcing the receiver device to transition to reception of the service via the MBMS bearer in response to determining that the MBMS bearer is available to the receiver device comprises forcing the receiver device to transition to reception of the service via the MBMS bearer in response to determining that the MBMS bearer is available to the receiver device and the unicast or MBMS delivery selection for the service at the receiver device is not a unicast delivery selection or a user preference for unicast is not indicated.

3. The receiver device of claim 1, wherein the processor is configured with processor executable instructions to perform operations such that receiving an indication of a determined network unicast/broadcast policy via the network interface comprises receiving an indication of a determined network unicast/broadcast policy via the network interface via one or more of an ANDSF, USD, SMS, Web Push, web browser, and a MBMS download service.

4. A receiver device, comprising:
a wireless network interface; and
a processor coupled to the wireless network interface, the processor configured with processor executable instructions to perform operations comprising:
receiving an indication of a determined network unicast/broadcast policy via the network interface, wherein the determined network unicast/broadcast policy governs delivery of a service provided via a unicast bearer and a Multimedia Broadcast Multicast Service (MBMS) bearer in a communication network;
updating a network policy with the received indication of the determined network unicast/broadcast policy;
receiving a unicast or MBMS delivery selection for the service;
determining whether the MBMS bearer is available to the receiver device;
determining whether a start up period has expired;
receiving the service via the unicast bearer while the start up period has not expired; and
forcing reception of the service in the receiver device via the MBMS bearer in response to determining that the MBMS bearer is available and that the startup period has expired.

5. The device of claim 4, wherein the processor is configured with processor executable instructions to perform operations further comprising:
determining whether a Multicast-Broadcast Single Frequency Network ("MBSFN") switch is in progress; and
receiving the service via the unicast bearer while the MBSFN switch is in progress.

6. The receiver device of claim 4, wherein:
the processor is configured with processor executable instructions to perform operations further comprising:
determining whether secondary information is needed; and
receiving the secondary information via the unicast bearer in response to determining that the secondary information is needed.

7. The receiver device of claim 6, wherein the secondary information is an auxiliary component of the service.

8. A receiver device, comprising:
a wireless network interface; and
a processor coupled to the wireless network interface, the processor configured with processor executable instructions to perform operations comprising:
receiving an indication of a determined network unicast/broadcast policy via the network interface, wherein the determined network unicast/broadcast policy governs delivery of a service provided via a unicast bearer and a Multimedia Broadcast Multicast Service (MBMS) bearer in a communication network;
updating a network policy with the received indication of the determined network unicast/broadcast policy;
receiving a unicast or MBMS delivery selection for the service;
determining whether the MBMS bearer is available to the receiver device;

forcing reception of the service via the MBMS bearer in response to determining that the MBMS bearer is available;

determining whether the MBMS bearer has failed after starting reception via the MBMS bearer;

determining whether a current network area in which the receiver device is located is an MBMS only area; and receiving the service via the unicast bearer in response to determining that the MBMS bearer has failed only in response to determining that the current area is not an MBMS only area.

9. The receiver device of claim 8, wherein the current area is one of a venue, a service area, or a Multicast-Broadcast Single Frequency Network ("MBSFN").

10. A receiver device, comprising:
a wireless network interface; and
a processor coupled to the wireless network interface, the processor configured with processor executable instructions to perform operations comprising:
receiving an indication of a determined network unicast/broadcast policy via the network interface, wherein the determined network unicast/broadcast policy governs delivery of a service provided via a unicast bearer and a Multimedia Broadcast Multicast Service (MBMS) bearer in a communication network;
updating a network policy with the received indication of the determined network unicast/broadcast policy;
receiving a unicast or MBMS delivery selection for the service;
determining whether the MBMS bearer is available to the receiver device;
forcing reception of the service via the MBMS bearer in response to determining that the MBMS bearer is available to the receiver device;
determining whether a repair segment or a replacement segment of the service is needed; and
receiving the repair segment or the replacement segment via the unicast bearer in response to determining the repair segment or the replacement segment of the service is needed.

11. A receiver device, comprising:
a wireless network interface; and
a processor coupled to the wireless network interface, the processor configured with processor executable instructions to perform operations comprising:
receiving an indication of a determined network unicast/broadcast policy via the network interface, wherein the determined network unicast/broadcast policy governs delivery of a service provided via a unicast bearer and a Multimedia Broadcast Multicast Service (MBMS) bearer in a communication network;
updating a network policy with the received indication of the determined network unicast/broadcast policy;
receiving a unicast or MBMS delivery selection for the service;
determining whether the MBMS bearer is available to the receiver device;
forcing the receiver device to transition to reception of the service via the MBMS bearer in response to determining that the MBMS bearer is available;
determining whether the MBMS bearer has failed after starting reception via the MBMS bearer;
determining whether the MBMS bearer is in an unlicensed band; and receiving the service via the unicast bearer in response to determining that the MBMS bearer has failed only in response to determining that the MBMS bearer is in an unlicensed band.

12. A receiver device, comprising:
a wireless network interface; and
a processor coupled to the wireless network interface, the processor configured with processor executable instructions to perform operations comprising:
receiving an indication of a determined network unicast/broadcast policy via the network interface, wherein the determined network unicast/broadcast policy governs delivery of a service provided via a unicast bearer and a Multimedia Broadcast Multicast Service (MBMS) bearer in a communication network;
updating a network policy with the received indication of the determined network unicast/broadcast policy;
receiving a unicast or MBMS delivery selection for the service;
determining whether a segment size of the service is larger than a threshold byte size;
determining whether the MBMS bearer is available to the receiver device; and
forcing reception of the service via the MBMS bearer in response to determining that the MBMS bearer is available and the segment size of the service is larger than a threshold byte size.

13. A receiver device, comprising:
a wireless network interface; and
the processor is configured with processor executable instructions to perform operations comprising:
receiving an indication of a determined network unicast/broadcast policy via the network interface, wherein the determined network unicast/broadcast policy governs delivery of a service provided via a unicast bearer and a Multimedia Broadcast Multicast Service (MBMS) bearer in a communication network;
updating a network policy with the received indication of the determined network unicast/broadcast policy;
receiving a unicast or MBMS delivery selection for the service;
applying the network policy to the unicast or MBMS delivery selection of the service to control use of the unicast bearer or the MBMS bearer to provision the service;
receiving a user indication to start a current application;
setting a priority for MBMS or unicast based on a priority of the current application and the network policy;
sending an MBMS interest indication message indicating the set priority for MBMS or unicast;
receiving a user indication to start a subsequent application;
determining whether the subsequent application has a higher priority than the priority of the current application; and
setting the priority for MBMS or unicast based on the priority of the subsequent application in response to determining that the subsequent application has a higher priority than the priority of the current application.

14. The receiver device of claim 13, wherein:
the wireless network interface is a modem; and
the processor is configured with processor executable instructions to perform operations further comprising tuning the modem of the receiver device to receive exclusively either the MBMS bearer or the unicast bearer based on the set priority for MBMS or unicast.

15. A packet gateway ("P-GW") server, traffic detection function ("TDF") server, network proxy server, or Dynamic Adaptive Streaming Over Hypertext Transfer Protocol ("HTTP") ("DASH") Assisting Network Element ("DANE") server, comprising:

a network interface; and a processor coupled to the network interface, the processor configured with processor executable instructions to perform operations comprising:

receiving an indication of a determined network unicast/broadcast policy via the network interface, wherein the determined network unicast/broadcast policy governs delivery of a service provided via a unicast bearer and a Multimedia Broadcast Multicast Service (MBMS) bearer in a communication network;

updating a network policy with the received indication of the determined network unicast/broadcast policy;

receiving a unicast or MBMS delivery selection for the service;

determining whether a unicast packet is intended for an unauthorized unicast entity;

determining whether a unicast additional charge is allowed for the unauthorized unicast entity;

marking a charging record of the unauthorized unicast entity and passing the unicast packet upon marking the charging record in response to determining that a unicast additional charge is allowed for the unauthorized unicast entity; and blocking the unicast packet in response to determining that a unicast additional charge is not allowed for the unauthorized unicast entity.

* * * * *